US006954745B2

(12) United States Patent
Rajan

(10) Patent No.: US 6,954,745 B2
(45) Date of Patent: Oct. 11, 2005

(54) SIGNAL PROCESSING SYSTEM

(75) Inventor: Jebu Jacob Rajan, Bracknell (GB)

(73) Assignee: Canon Kabushiki Kaisha, Tokyo (JP)

( * ) Notice: Subject to any disclaimer, the term of this patent is extended or adjusted under 35 U.S.C. 154(b) by 593 days.

(21) Appl. No.: 09/866,597

(22) Filed: May 30, 2001

(65) Prior Publication Data

US 2002/0055913 A1 May 9, 2002

(30) Foreign Application Priority Data

Jun. 2, 2000 (GB) ............................................ 0013536
Aug. 17, 2000 (GB) ............................................ 0020311

(51) Int. Cl.[7] ................................................ G06N 5/00
(52) U.S. Cl. ........................................ 706/22; 706/45
(58) Field of Search ........................... 705/22; 702/181, 702/189, 190; 342/378

(56) References Cited

U.S. PATENT DOCUMENTS

| | | | | |
|---|---|---|---|---|
| 4,386,237 A | | 5/1983 | Virupaksha et al. | 179/15.55 R |
| 4,811,399 A | | 3/1989 | Landell et al. | 381/43 |
| 4,905,286 A | | 2/1990 | Sedgwick et al. | 381/43 |
| 5,012,518 A | | 4/1991 | Liu et al. | 381/42 |
| 5,315,538 A | * | 5/1994 | Borrell et al. | 702/189 |
| 5,432,884 A | | 7/1995 | Kapanen et al. | 395/2.37 |
| 5,611,019 A | | 3/1997 | Nakatoh et al. | 395/2.42 |
| 5,742,694 A | | 4/1998 | Eatwell | 381/94.2 |
| 5,784,297 A | * | 7/1998 | O'Brien et al. | 702/181 |
| 5,799,276 A | | 8/1998 | Komissarchik et al. | 704/251 |
| 5,884,255 A | | 3/1999 | Cox | 704/233 |
| 5,884,269 A | | 3/1999 | Cellier et al. | 704/501 |
| 6,018,317 A | * | 1/2000 | Dogan et al. | 342/378 |
| 6,044,336 A | * | 3/2000 | Marmarelis et al. | 702/190 |
| 6,134,518 A | | 10/2000 | Cohen et al. | 704/201 |
| 6,226,613 B1 | | 5/2001 | Turin | 704/256 |
| 6,377,919 B1 | | 4/2002 | Burnett et al. | 704/231 |
| 6,438,513 B1 | | 8/2002 | Pastor et al. | 702/191 |
| 6,516,090 B1 | | 2/2003 | Lennon et al. | 382/173 |
| 6,549,854 B1 | * | 4/2003 | Malinverno et al. | 702/16 |
| 6,708,146 B1 | | 3/2004 | Sewall et al. | 704/217 |

FOREIGN PATENT DOCUMENTS

| | | |
|---|---|---|
| EP | 0 554 083 A2 | 8/1993 |
| EP | 0 631 402 A2 | 12/1994 |
| EP | 0 674 306 A2 | 9/1995 |
| EP | 0 952 589 A2 | 10/1999 |
| EP | 0 996 112 A2 | 4/2000 |
| EP | 1 022 583 A2 | 7/2000 |
| EP | 1 160 768 A2 | 12/2001 |
| EP | 1 034 441 B1 | 4/2003 |
| GB | 2 137 052 A | 9/1984 |
| GB | 2 332 054 A | 6/1999 |
| GB | 2 332 055 A | 6/1999 |
| GB | 2 345 967 A | 7/2000 |

(Continued)

OTHER PUBLICATIONS

Numerical Recipes in C by W. Press, et al., Chapter 7, Cambridge University Press (1992).

(Continued)

*Primary Examiner*—Wilbert L. Starks, Jr.
(74) *Attorney, Agent, or Firm*—Fitzpatrick, Cella, Harper & Scinto

(57) ABSTRACT

A signal processing system is provided which includes one or more receivers for receiving signals generated by a plurality of signal sources. The system has a memory for storing a predetermined function which gives, for a set of input signal values, a probability density for parameters of a respective signal model which is assumed to have generated the signals in the received signal values. The system applies a set of received signal values to the stored function to generate the probability density function and then draws samples from it. The system then analyses the drawn samples to determine parameter values representative of the signal from at least one of the sources.

82 Claims, 18 Drawing Sheets

FOREIGN PATENT DOCUMENTS

| | | | |
|---|---|---|---|
| GB | 2 349 717 | A | 11/2000 |
| GB | 2 356 106 | A | 5/2001 |
| GB | 2 356 107 | A | 5/2001 |
| GB | 2 356 313 | A | 5/2001 |
| GB | 2 356 314 | A | 5/2001 |
| GB | 2 360 670 | A | 9/2001 |
| GB | 2 361 339 | A | 10/2001 |
| GB | 2 363 557 | A | 12/2001 |
| JP | 2001/044926 | | 2/2001 |
| WO | WO 92/22891 | | 12/1992 |
| WO | WO 98/38631 | | 9/1998 |
| WO | WO 99/28760 | | 6/1999 |
| WO | WO 99/28761 | | 6/1999 |
| WO | WO 99/64887 | | 12/1999 |
| WO | WO 00/11650 | | 3/2000 |
| WO | WO 00/38179 | | 6/2000 |
| WO | WO 00/45375 | | 8/2000 |
| WO | WO 00/54168 | | 9/2000 |

OTHER PUBLICATIONS

"Reversible jump Markov chain Monte Carlo Computation and Bayesian model determination" by Peter Green, Biometrika, vol. 82, pp. 711–732 (1995).

"The Simulation Smoother For Time Series Models", Biometrika, vol. 82, 2, pp. 339–350 (1995).

"Probabilistic inference using Markov chain Monte Carlo methods" by R. Neal. Technical Report CRG–TR–93–1, Department of Computer Science, University of Toronto (1993).

"Fundamentals of Speech Recognition," Rabiner, et al., Prentice Hall, Englewood Cliffs, New Jersey, pp. 115 and 116, 1993.

"Bayesian Separation and Recovery of Convolutively Mixed Autoregssive Sources", Godsill, et al., ICASSP, Mar. 1999.

"Statistical Properties of STFT Ratios for Two Channel Systems and Application to Blind Source Separation", Balan, et al., Siemens Corporate Research, Princeton, N, pp. 429–434.

Bayesian Approach to Parameter Estimation and Interpolation of Time–Varying Autoregressive Interpolation of Time–Varying Autoregressive Process Using the Gibbs Sampler, Rajan, et al., IEE Proc.–Vis. Image Signal Process., vol. 44, No. 4, Aug. 1997, pp. 249–256.

"An Introduction to the Kalman Filter", Welch, et al., Dept. of Computer Science, University of North Carolina at Chapel Hill, NC, Sep. 1997.

Srinivasan, et al., "Query Expansion for Imperfect Speech: Applications in Distributed Learning," Proc. IEEE Workshop on Content–Based Access of Image and Video Libraries, 2000, pp. 50–54.

Couvreur, et al., "Wavelet–based Non–Parametric HMM's: Theory and Applications," Proc. International Conference Acoustics, Speech and Signal Processing, Istanbul, vol. 1, Jun. 5–9, 2000, pp. 604–607.

Hopgood, et al., "Bayesian Single Channel Blind Deconvolution Using Parametric Signal and Channel Models," Proc. IEEE Workshop on Applications of Signal Processing to Audio and Acoustics, New Paltz, NY, Oct. 17–20, 1999, pp. 151–154.

Andrieu, et al., "Bayesian Blind Marginal Separation of Convolutively Mixed Discrete Sources," IEEE Proc., 1998, pp. 43–52.

* cited by examiner

SIGNAL PROCESSING SYSTEM

BACKGROUND OF THE INVENTION

Field of the Invention

The present invention relates to a signal processing method and apparatus. The invention is particularly relevant to a statistical analysis of signals output by a plurality of sensors in response to signals generated by a plurality of sources. The invention may be used in speech applications and in other applications to process the received signals in order to separate the signals generated by the plurality of sources. The invention can also be used to identify the number of sources that are present.

There exists a need to be able to process signals output by a plurality of sensors in response to signals generated by a plurality of sources. The sources may, for example, be different users speaking and the sensors may be microphones. Current techniques employ arrays of microphones and an adaptive beam forming technique in order to isolate the speech from one of the speakers. This kind of beam forming system suffers from a number of problems. Firstly, it can only isolate signals from sources that are spatially distinct. It also does not work if the sources are relatively close together since the "beam" which it uses has a finite resolution. It is also necessary to know the directions from which the signals of interest will arrive and also the spacing between the sensors in the sensor array. Further, if N sensors are available, then only N−1 "nulls" can be created within the sensing zone.

SUMMARY OF THE INVENTION

An aim of the present invention is to provide an alternative technique for processing the signals output from a plurality of sensors in response to signals received from a plurality of sources.

According to one aspect, the present invention provides a signal processing apparatus comprising: one or more receivers for receiving a set of signal values representative of signals generated by a plurality of signal sources; a memory for storing a probability density function for parameters of a respective signal model, each of which is assumed to have generated a respective one of the signals represented by the received signal values; means for applying the received signal values to the probability density function; means for processing the probability density function with those values applied to derive samples of parameter values from the probability density function; and means for analysing some of the derived samples to determine parameter values that are representative of the signals generated by at least one of the sources.

BRIEF DESCRIPTION OF THE DRAWINGS

Exemplary embodiments of the present invention will now be described with reference to the accompanying drawings in which.

DESCRIPTION OF THE PREFERRED EMBODIMENTS

Embodiments of the present invention can be implemented on computer hardware, but the embodiment to be described is implemented in software which is run in conjunction with processing hardware such as a personal computer, workstation, photocopier, facsimile machine or the like.

Figure 1:
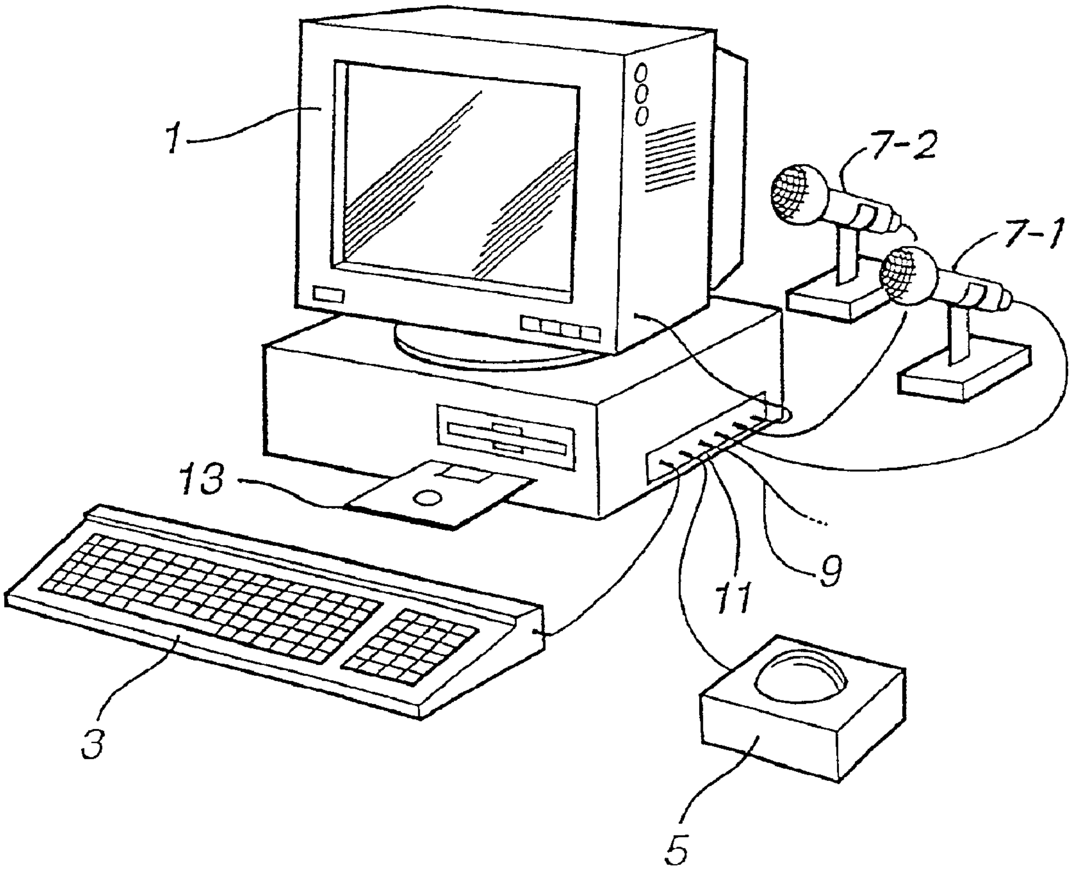
FIG. 1 is a schematic view of a computer which may be programmed to operate in accordance with an embodiment of the present invention.

FIG. 1 is a personal computer (PC) 1 which may be programmed to operate an embodiment of the present invention. A keyboard 3, a pointing device 5, two microphones 7-1 and 7-2 and a telephone-line 9 are connected to the PC 1 via an interface 11. A keyboard 3 and pointing device 5 allow the system to be controlled by a user. The microphones 7 convert the acoustic speech signal of one or more users into equivalent electrical signals and supplies them to the PC 1 for processing. An internal modem and speech receiving circuit (not shown) may be connected to the telephone line 9 so that the PC 1 can communicate with, for example, a remote computer or with a remote user.

The program instructions which make the PC 1 operate in accordance with the present invention may be supplied for use with an existing PC 1 on, for example, a storage device such as a magnetic disc 13, or by downloading the software from the Internet (not shown) via the internal modem and telephone line 9.

The operation of a speech recognition system which receives signals output from multiple microphones in response to speech signals generated from a plurality of speakers will be described. However, in order to facilitate the understanding of the operation of such a recognition system, a speech recognition system which performs a similar analysis of the signals output from the microphone for the case of a single speaker and single microphone will be described first with reference to FIG. 2 to 9.

Single Speaker Single Microphone

Figure 2:
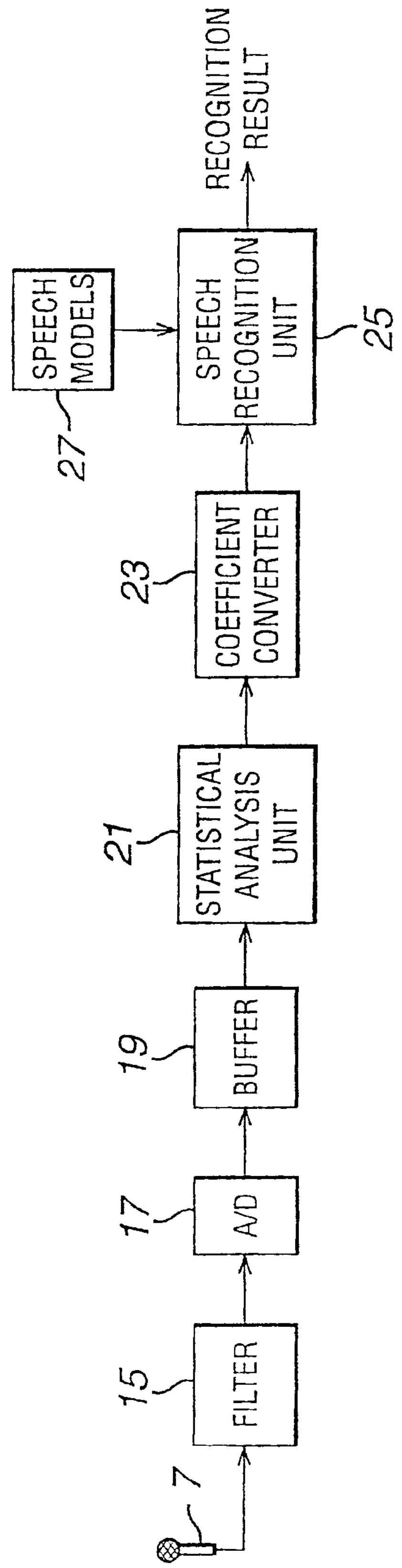
FIG. 2 is a block diagram illustrating the principal components of a speech recognition system.

As shown in FIG. 2, electrical signals representative of the input speech from the microphone 7 are input to a filter 15 which removes unwanted frequencies (in this embodiment frequencies above 8 kHz) within the input signal. The filtered signal is then sampled (at a rate of 16 kHz) and digitised by the analogue to digital converter 17 and the digitised speech samples are then stored in a buffer 19. Sequential blocks (or frames) of speech samples are then passed from the buffer 19 to a statistical analysis unit 21 which performs a statistical analysis of each frame of speech samples in sequence to determine, amongst other things, a set of auto regressive (AR) coefficients representative of the speech within the frame. In this embodiment, the AR coefficients output by the statistical analysis unit 21 are then input, via a coefficient converter 23 to a cepstral based speech recognition unit 25. In this embodiment, therefore, the coefficient converter 23 converts the AR coefficients output by the analysis unit 21 into cepstral coefficients. This can be achieved using the conversion technique described in, for example, "Fundamentals of Speech Recognition" by Rabiner and Juang at pages 115 and 116. The speech recognition unit 25 then compares the cepstral coefficients for successive frames of speech with a set of stored speech models 27, which may be template based or Hidden Markov Model based, to generate a recognition result.

Statistical Analysis Unit—Theory and Overview

As mentioned above, the statistical analysis unit 21 analyses the speech within successive frames of the input speech signal. In most speech processing systems, the frames are overlapping. However, in this embodiment, the frames of speech are non-overlapping and have a duration of 20 ms which, with the 16 kHz sampling rate of the analogue to digital converter 17, results in a frame size of 320 samples.

Figure 3:
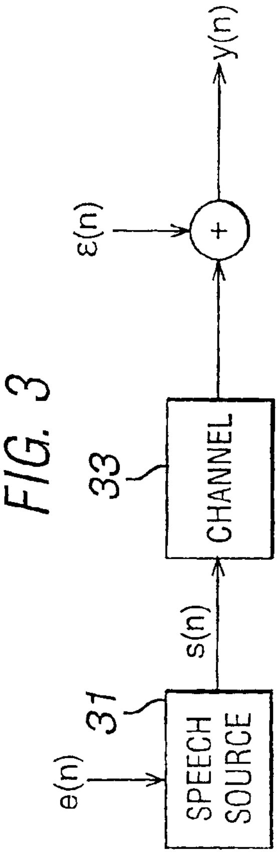
FIG. 3 is a block diagram representing a model employed by a statistical analysis unit which forms part of the speech recognition system shown in FIG. 2.

In order to perform the statistical analysis on each of the frames, the analysis unit 21 assumes that there is an underlying process which generated each sample within the frame. The model of this process used in this embodiment is shown in FIG. 3. As shown, the process is modelled by a speech source 31 which generates, at time t=n, a raw speech sample s(n). Since there are physical constraints on the movement of the speech articulators, there is some correlation between neighbouring speech samples. Therefore, in this embodiment, the speech source 31 is modelled by an auto regressive (AR) process. In other words, the statistical analysis unit 21 assumes that a current raw speech sample (s(n)) can be determined from a linear weighted combination of the most recent previous raw speech samples, i.e.:

$$s(n)=a_1s(n-1)+a_2s(n-2)+\ldots+a_ks(n-k)+e(n) \tag{1}$$

where $a_1, a_2 \ldots a_k$ are the AR filter coefficients representing the amount of correlation between the speech samples; k is the AR filter model order; and e(n) represents random process noise which is involved in the generation of the raw speech samples. As those skilled in the art of speech processing will appreciate, these AR filter coefficients are the same coefficients that the linear prediction (LP) analysis estimates albeit using a different processing technique.

As shown in FIG. 3, the raw speech samples s(n) generated by the speech source are input to a channel 33 which models the acoustic environment between the speech source 31 and the output of the analogue to digital converter 17. Ideally, the channel 33 should simply attenuate the speech as it travels from the source 31 to the microphone 7. However, due to reverberation and other distortive effects, the signal (y(n)) output by the analogue to digital converter 17 will depend not only on the current raw speech sample (s(n)) but it will also depend upon previous raw speech samples. Therefore, in this embodiment, the statistical analysis unit 21 models the channel 33 by a moving average (MA) filter, i.e.:

$$y(n)=h_0s(n)+h_1s(n-1)+h_2s(n-2)+\ldots+h_rs(n-r)+\epsilon(n) \tag{2}$$

where y(n) represents the signal sample output by the analogue to digital converter 17 at time t=n; $h_0, h_1, h_2 \ldots h_r$ are the channel filter coefficients representing the amount of distortion within the channel 33; r is the channel filter model order; and $\epsilon(n)$ represents a random additive measurement noise component.

For the current frame of speech being processed, the filter coefficients for both the speech source and the channel are assumed to be constant but unknown. Therefore, considering all N samples (where N=320) in the current frame being processed gives:

$$\begin{aligned} s(n) &= a_1s(n-1)+a_2s(n-2)+\ldots+a_ks(n-k)+e(n) \\ s(n-1) &= a_1s(n-2)+a_2s(n-3)+\ldots+a_ks(n-k-1)+e(n-1) \\ &\vdots \\ s(n-N+1) &= \\ & a_1s(n-N)+a_2s(n-N-1)+\ldots+a_ks(n-k-N+1)+e(n-N+1) \end{aligned} \tag{3}$$

which can be written in vector form as:

$$\underline{s}(n)=S\cdot\underline{a}+\underline{e}(n) \tag{4}$$

where $$S=\begin{bmatrix} s(n-1) & s(n-2) & s(n-3) & \dots & s(n-k) \\ s(n-2) & s(n-3) & s(n-4) & \dots & s(n-k-1) \\ s(n-3) & s(n-4) & s(n-5) & \dots & s(n-k-2) \\ \vdots & & & \ddots & \\ s(n-N) & s(n-N-1) & s(n-N-2) & \dots & s(n-k-N+1) \end{bmatrix}_{N\times k}$$

and $$\underline{a}=\begin{bmatrix} a_1 \\ a_2 \\ a_3 \\ \vdots \\ a_k \end{bmatrix}_{k\times 1} \quad \underline{s}(n)=\begin{bmatrix} s(n) \\ s(n-1) \\ s(n-2) \\ \vdots \\ s(n-N+1) \end{bmatrix}_{N\times 1} \quad \underline{e}(n)=\begin{bmatrix} e(n) \\ e(n-1) \\ e(n-2) \\ \vdots \\ e(n-N+1) \end{bmatrix}_{N\times 1}$$

As will be apparent from the following discussion, it is also convenient to rewrite equation (3) in terms of the random error component (often referred to as the residual) e(n). This gives:

$$e(n)=s(n)-a_1s(n-1)-a_2s(n-2)-\dots-a_ks(n-k) \tag{5}$$

$$e(n-1)=s(n-1)-a_1s(n-2)-a_2s(n-3)-\dots-a_ks(n-k-1)$$

$$\vdots$$

$$e(n-N+1)=$$
$$s(n-N+1)-a_1s(n-N)-a_2s(n-N-1)-\dots-a_ks(n-k-N+1)$$

which can be written in vector notation as:

$$\underline{e}(n)=\ddot{A}\underline{s}(n) \tag{6}$$

where $$\ddot{A}=\begin{bmatrix} 1 & -a_1 & -a_2 & -a_3 & \dots & -a_k & 0 & 0 & 0 & \cdots & 0 \\ 0 & 1 & -a_1 & -a_2 & \dots & -a_{k-1} & -a_k & 0 & 0 & \cdots & 0 \\ 0 & 0 & 1 & -a_1 & \dots & -a_{k-2} & -a_{k-1} & -a_k & 0 & \cdots & 0 \\ \vdots & & & & \ddots & & & & & & \\ 0 & & & & & & & & & & 1 \end{bmatrix}_{N\times N}$$

Similarly, considering the channel model defined by equation (2), with $h_0=1$ (since this provides a more stable solution), gives:

$$q(n)=h_1s(n-1)+h_2s(n-2)+\dots+h_rs(n-r)+\varepsilon(n) \tag{7}$$

$$q(n-1)\approx h_1s(n-2)+h_2s(n-3)+\dots+h_rs(n-r-1)+\varepsilon(n-1)$$

$$\vdots$$

$$q(n-N+1)=h_1s(n-N)+h_2s(n-N-1)+\dots+h_rs(n-r-N+1)+\varepsilon(n-N+1)$$

(where q(n)=y(n)−s(n)) which can be written in vector form as:

$$\underline{q}(n)=Y\cdot\underline{h}+\underline{\epsilon}(n) \tag{8}$$

where $$Y=\begin{bmatrix} s(n-1) & s(n-2) & s(n-3) & \dots & s(n-r) \\ s(n-2) & s(n-3) & s(n-4) & \dots & s(n-r-1) \\ s(n-3) & s(n-4) & s(n-5) & \dots & s(n-r-2) \\ \vdots & & & \ddots & \\ s(n-N) & s(n-N-1) & s(n-N-2) & \dots & s(n-r-N+1) \end{bmatrix}_{N\times r}$$

and $$\underline{h}=\begin{bmatrix} h_1 \\ h_2 \\ h_3 \\ \vdots \\ h_r \end{bmatrix}_{r\times 1} \quad \underline{q}(n)=\begin{bmatrix} q(n) \\ q(n-1) \\ q(n-2) \\ \vdots \\ q(n-N+1) \end{bmatrix}_{N\times 1} \quad \underline{\varepsilon}(n)=\begin{bmatrix} \varepsilon(n) \\ \varepsilon(n-1) \\ \varepsilon(n-2) \\ \vdots \\ \varepsilon(n-N+1) \end{bmatrix}_{N\times 1}$$

In this embodiment, the analysis unit 21 aims to determine, amongst other things, values for the AR filter coefficients ($\underline{a}$) which best represent the observed signal samples ($\underline{y}$(n)) in the current frame. It does this by determining the AR filter coefficients ($\underline{a}$) that maximise the joint probability density function of the speech model, channel model, raw speech samples and the noise statistics given the observed signal samples output from the analogue to digital converter 17, i.e. by determining:

$$\max_{\underline{a}}\{p(\underline{a},k,\underline{h},r,\sigma_e^2,\sigma_\varepsilon^2,\underline{s}(n)\mid\underline{y}(n))\} \tag{9}$$

where $\sigma_e^2$ and $\sigma_\epsilon^2$ represent the process and measurement noise statistics respectively. As those skilled in the art will appreciate, this function defines the probability that a particular speech model, channel model, raw speech samples and noise statistics generated the observed frame of speech samples ($\underline{y}$(n)) from the analogue to digital converter. To do this, the statistical analysis unit 21 must determine what this function looks like. This problem can be simplified by rearranging this probability density function using Bayes law to give:

$$\frac{p(\underline{y}(n)\mid\underline{s}(n),\underline{h},r,\sigma_\varepsilon^2)p(\underline{s}(n)\mid\underline{a},k,\sigma_e^2)\,p(\underline{a}\mid k)p(\underline{h}\mid r)p(\sigma_\varepsilon^2)p(\sigma_e^2)p(k)p(r)}{p(\underline{y}(n))} \tag{10}$$

As those skilled in the art will appreciate, the denominator of equation (10) can be ignored since the probability of the signals from the analogue to digital converter is constant for all choices of model. Therefore, the AR filter coefficients that maximise the function defined by equation (9) will also maximise the numerator of equation (10).

Each of the terms on the numerator of equation (10) will now be considered in turn.

$p(\underline{s}(n)|\underline{a}, k, \sigma_e^2)$

This term represents the joint probability density function for generating the vector of raw speech samples ($\underline{s}$(n)) during a frame, given the AR filter coefficients ($\underline{a}$), the AR filter model order (k) and the process noise statistics ($\sigma_e^2$). From equation (6) above, this joint probability density function for the raw speech samples can be determined from the joint probability density function for the process noise. In particular $p(\underline{s}(n)|\underline{a}, k, \sigma_e^2)$ is given by:

$$p(\underline{s}(n)\mid \underline{a}, k, \sigma_e^2) = p(\underline{e}(n))\left|\frac{\delta \underline{e}(n)}{\delta \underline{s}(n)}\right|_{\underline{e}(n)=\underline{s}(n)-S\underline{a}} \tag{11}$$

where $p(\underline{e}(n))$ is the joint probability density function for the process noise during a frame of the input speech and the second term on the right-hand side is known as the Jacobean of the transformation. In this case, the Jacobean is unity because of the triangular form of the matrix $\ddot{A}$ (see equations (6) above).

In this embodiment, the statistical analysis unit 21 assumes that the process noise associated with the speech source 31 is Gaussian having zero mean and some unknown variance $\sigma_e^2$. The statistical analysis unit 21 also assumes that the process noise at one time point is independent of the process noise at another time point. Therefore, the joint probability density function for the process noise during a frame of the input speech (which defines the probability of any given vector of process noise $\underline{e}(n)$ occurring) is given by:

$$p(\underline{e}(n)) = (2\pi\sigma_e^2)^{-\frac{N}{2}}\exp\left[\frac{-\underline{e}(n)^T\underline{e}(n)}{2\sigma_e^2}\right] \tag{12}$$

Therefore, the joint probability density function for a vector of raw speech samples given the AR filter coefficients ($\underline{a}$), the AR filter model order (k) and the process noise variance ($\sigma_e^2$) is given by:

$$p(\underline{s}(n)\mid \underline{a}, k, \sigma_e^2) = (2\pi\sigma_e^2)^{-\frac{N}{2}} \exp\left[\frac{-1}{2\sigma_e^2}(\underline{s}(n)^T\underline{s}(n) - 2\underline{a}^TS\underline{s}(n) + \underline{a}^TS^TS\underline{a})\right] \tag{13}$$

$p(\underline{y}(n)|\underline{s}(n), \underline{h}, r, \sigma_\epsilon^2)$

This term represents the joint probability density function for generating the vector of speech samples ($\underline{y}(n)$) output from the analogue to digital converter 17, given the vector of raw speech samples ($\underline{s}(n)$), the channel filter coefficients ($\underline{h}$), the channel filter model order (r) and the measurement noise statistics ($\sigma_\epsilon^2$)

From equation (8), this joint probability density function can be determined from the joint probability density function for the process noise. In particular, $p(\underline{y}(n)|\underline{s}(n), \underline{h}, r, \sigma_\epsilon^2)$ is given by:

$$p(\underline{y}(n)\mid \underline{s}(n), \underline{h}, r, \sigma_\epsilon^2) = p(\underline{\epsilon}(n))\left|\frac{\delta \underline{\epsilon}(n)}{\delta \underline{y}(n)}\right|_{\underline{\epsilon}(n) = \underline{q}(n) - Y\underline{h}} \tag{14}$$

where $p(\underline{\epsilon}(n))$ is the joint probability density function for the measurement noise during a frame of the input speech and the second term on the right hand side is the Jacobean of the transformation which again has a value of one.

In this embodiment, the statistical analysis unit 21 assumes that the measurement noise is Gaussian having zero mean and some unknown variance $\sigma_\epsilon^2$. It also assumes that the measurement noise at one time point is independent of the measurement noise at another time point. Therefore, the joint probability density function for the measurement noise in a frame of the input speech will have the same form as the process noise defined in equation (12). Therefore, the joint probability density function for a vector of speech samples ($\underline{y}(n)$) output from the analogue to digital converter 17, given the channel filter coefficients ($\underline{h}$), the channel filter model order (r), the measurement noise statistics ($\sigma_\epsilon^2$) and the raw speech samples ($\underline{s}(n)$) will have the following form:

$$p(\underline{y}(n)\mid \underline{s}(n), \underline{h}, r, \sigma_\epsilon^2) = (2\pi\sigma_\epsilon^2)^{-\frac{N}{2}}\exp\left[\frac{-1}{2\sigma_\epsilon^2}(\underline{q}(n)^T\underline{q}(n) - 2\underline{h}^TY\underline{q}(n) + \underline{h}^TY^TY\underline{h})\right] \tag{15}$$

As those skilled in the art will appreciate, although this joint probability density function for the vector of speech samples ($\underline{y}(n)$) is in terms of the variable $\underline{q}(n)$, this does not matter since $\underline{q}(n)$ is a function of $\underline{y}(n)$ and $\underline{s}(n)$, and $\underline{s}(n)$ is a given variable (ie known) for this probability density function.

$p(\underline{a}|k)$

This term defines the prior probability density function for the AR filter coefficients ($\underline{a}$) and it allows the statistical analysis unit 21 to introduce knowledge about what values it expects these coefficients will take. In this embodiment, the statistical analysis unit 21 models this prior probability density function by a Gaussian having an unknown variance ($\sigma_a^2$) and mean vector ($\underline{\mu}_a$) i.e.:

$$p(\underline{a}\mid k, \sigma_a^2, \underline{\mu}_a) = (2\pi\sigma_a^2)^{-\frac{N}{2}}\exp\left[\frac{-(\underline{a}-\underline{\mu}_a)^T(\underline{a}-\underline{\mu}_a)}{2\sigma_a^2}\right] \tag{16}$$

By introducing the new variables $\sigma_a^2$ and $\underline{\mu}_a$, the prior density functions ($p(\sigma_a^2)$ and $P(\underline{\mu}_a)$) for these variables must be added to the numerator of equation (10) above. Initially, for the first frame of speech being processed the mean vector ($\underline{\mu}_a$) can be set to zero and for the second and subsequent frames of speech being processed, it can be set to the mean vector obtained during the processing of the previous frame. In this case, $p(\underline{\mu}_a)$ is just a Dirac delta function located at the current value of $\underline{\mu}_a$ and can therefore be ignored.

With regard to the prior probability density function for the variance of the AR filter coefficients, the statistical analysis unit 21 could set this equal to some constant to imply that all variances are equally probable. However, this term can be used to introduce knowledge about what the variance of the AR filter coefficients is expected to be. In this embodiment, since variances are always positive, the statistical analysis unit 21 models this variance prior probability density function by an Inverse Gamma function having parameters $\alpha_a$ and $\beta_a$, i.e.:

$$p(\sigma_a^2\mid \alpha_a, \beta_a) = \frac{(\sigma_a^2)^{-(\alpha_a+1)}}{\beta_a\Gamma(\alpha_a)}\exp\left[\frac{-1}{\sigma_a^2\beta_a}\right] \tag{17}$$

At the beginning of the speech being processed, the statistical analysis unit 21 will not have much knowledge about the variance of the AR filter coefficients. Therefore, initially, the statistical analysis unit 21 sets the variance $\sigma_a^2$ and the $\alpha$ and $\beta$ parameters of the Inverse Gamma function to ensure that this probability density function is fairly flat and therefore non-informative. However, after the first frame of speech has been processed, these parameters can be set more accurately during the processing of the next frame of speech by using the parameter values calculated during the processing of the previous frame of speech.

$p(\underline{h}|r)$

This term represents the prior probability density function for the channel model coefficients ($\underline{h}$) and it allows the statistical analysis unit 21 to introduce knowledge about what values it expects these coefficients to take. As with the prior probability density function for the AR filter coefficients, in this embodiment, this probability density function is modelled by a Gaussian having an unknown variance ($\sigma_h^2$) and mean vector ($\underline{\mu}_h$), i.e.:

$$p(\underline{h} \mid r, \sigma_h^2, \underline{\mu}_h) = (2\pi\sigma_h^2)^{-\frac{N}{2}} \exp\left[\frac{-(\underline{h}-\underline{\mu}_h)^T(\underline{h}-\underline{\mu}_h)}{2\sigma_h^2}\right] \tag{18}$$

Again, by introducing these new variables, the prior density functions ($p(\sigma_h)$ and $p(\underline{\mu}_h)$) must be added to the numerator of equation (10). Again, the mean vector can initially be set to zero and after the first frame of speech has been processed and for all subsequent frames of speech being processed, the mean vector can be set to equal the mean vector obtained during the processing of the previous frame. Therefore, $p(\underline{\mu}_h)$ is also just a Dirac delta function located at the current value of $\underline{\mu}_h$ and can be ignored.

With regard to the prior probability density function for the variance of the channel filter coefficients, again, in this embodiment, this is modelled by an Inverse Gamma function having parameters $\alpha_h$ and $\beta_h$. Again, the variance ($\sigma_h^2$) and the $\alpha$ and $\beta$ parameters of the Inverse Gamma function can be chosen initially so that these densities are non-informative so that they will have little effect on the subsequent processing of the initial frame.

$p(\sigma_e^2)$ and $p(\sigma_\epsilon^2)$

These terms are the prior probability density functions for the process and measurement noise variances and again, these allow the statistical analysis unit 21 to introduce knowledge about what values it expects these noise variances will take. As with the other variances, in this embodiment, the statistical analysis unit 21 models these by an Inverse Gamma function having parameters $\alpha_e$, $\beta_e$ and $\alpha_\epsilon$, $\beta_\epsilon$ respectively. Again, these variances and these Gamma function parameters can be set initially so that they are non-informative and will not appreciably affect the subsequent calculations for the initial frame.

p(k) and p(r)

These terms are the prior probability density functions for the AR filter model order (k) and the channel model order (r) respectively. In this embodiment, these are modelled by a uniform distribution up to some maximum order. In this way, there is no prior bias on the number of coefficients in the models except that they can not exceed these predefined maximums. In this embodiment, the maximum AR filter model order (k) is thirty and the maximum channel model order (r) is one hundred and fifty.

Therefore, inserting the relevant equations into the numerator of equation (10) gives the following joint probability density function which is proportional to $p(\underline{a},k,\underline{h},r,\sigma_a^2,\sigma_h^2,\sigma_e^2,\sigma_\epsilon^2,\underline{s}(n)|\underline{y}(n))$:

$$(2\pi\sigma_\varepsilon^2)^{-\frac{N}{2}} \exp\left[\frac{-1}{2\sigma_\varepsilon^2}(\underline{q}(n)^T\underline{q}(n) - 2\underline{h}^T Y\underline{q}(n) + \underline{h}^T Y^T Y\underline{h})\right] \times \tag{19}$$

$$(2\pi\sigma_e^2)^{-\frac{N}{2}} \exp\left[\frac{-1}{2\sigma_e^2}(\underline{s}(n)^T\underline{s}(n) - 2\underline{a}^T S\underline{s}(n) + \underline{a}^T S^T S\underline{a})\right] \times$$

$$(2\pi\sigma_a^2)^{-\frac{N}{2}} \exp\left[\frac{-(\underline{a}-\underline{\mu}_a)^T(\underline{a}-\underline{\mu}_a)}{2\sigma_a^2}\right] \times$$

$$(2\pi\sigma_h^2)^{-\frac{N}{2}} \exp\left[\frac{-(\underline{h}-\underline{\mu}_h)^T(\underline{h}-\underline{\mu}_h)}{2\sigma_h^2}\right] \times$$

-continued $$\frac{(\sigma_a^2)^{-(\alpha_a+1)}}{\beta_a\Gamma(\alpha_a)} \exp\left[\frac{-1}{\sigma_a^2\beta_a}\right] \times \frac{(\sigma_h^2)^{-(\alpha_h+1)}}{\beta_h\Gamma(\alpha_h)} \exp\left[\frac{-1}{\sigma_h^2\beta_h}\right] \times$$

$$\frac{(\sigma_e^2)^{-(\alpha_e+1)}}{\beta_e\Gamma(\alpha_e)} \exp\left[\frac{-1}{\sigma_e^2\beta_e}\right] \times \frac{(\sigma_\varepsilon^2)^{-(\alpha_\varepsilon+1)}}{\beta_\varepsilon\Gamma(\alpha_\varepsilon)} \exp\left[\frac{-1}{\sigma_\varepsilon^2\beta_\varepsilon}\right]$$

Gibbs Sampler

In order to determine the form of this joint probability density function, the statistical analysis unit 21 "draws samples" from it. In this embodiment, since the joint probability density function to be sampled is a complex multivariate function, a Gibbs sampler is used which breaks down the problem into one of drawing samples from probability density functions of smaller dimensionality. In particular, the Gibbs sampler proceeds by drawing random variates from conditional densities as follows:

first iteration $$p(\underline{a}, k \mid h^0, r^0, \sigma_e^{2^0}, \sigma_\varepsilon^{2^0}, \sigma_a^{2^0}, \sigma_h^{2^0}, \underline{s}(n)^0, \underline{y}(n)) \to \underline{a}^1, k^1$$

$$p(\underline{h}, r \mid \underline{a}^1, k^1, \sigma_e^{2^0}, \sigma_\varepsilon^{2^0}, \sigma_a^{2^0}, \sigma_h^{2^0}, \underline{s}(n)^0, \underline{y}(n)) \to \underline{h}^1, k^1$$

$$p(\sigma_e^2 \mid \underline{a}^1, k^1, \underline{h}^1, r^1, \sigma_\varepsilon^{2^0}, \sigma_a^{2^0}, \sigma_h^{2^0}, \underline{s}(n)^0, \underline{y}(n)) \to \sigma_e^{2^1}$$

$$\vdots$$

$$p(\sigma_h^{2^1} \mid \underline{a}^1, k^1, \underline{h}^1, r^1, \sigma_\varepsilon^{2^1}, \sigma_a^{2^1}, \sigma_h^{2^1}, \underline{s}(n)^0, \underline{y}(n)) \to \sigma_h^{2^1}$$

second iteration $$p(\underline{a}, k \mid \underline{h}^1, r^1, \sigma_e^{2^1}, \sigma_\varepsilon^{2^1}, \sigma_h^{2^1}, \underline{s}(n)^1, \underline{y}(n)) \to \underline{a}^2, k^2$$

$$p(\underline{h}, r \mid \underline{a}^2, k^2, \sigma_e^{2^1}, \sigma_\varepsilon^{2^1}, \sigma_a^{2^1}, \sigma_h^{2^1}, s(n)^1, y(n)) \to \underline{h}^2, r^2$$

$$\vdots$$

etc.

where ($h^0$, $r^0$, $(\sigma_e^2)^0$, $(\sigma_\epsilon^2)^0$, $(\sigma_a^2)^0$, $(\sigma_h^2)^0$, $\underline{s}(n)^0$) are initial values which may be obtained from the results of the statistical analysis of the previous frame of speech, or where there are no previous frames, can be set to appropriate values that will be known to those skilled in the art of speech processing.

As those skilled in the art will appreciate, these conditional densities are obtained by inserting the current values for the given (or known) variables into the terms of the density function of equation (19). For the conditional density $p(\underline{a},k| \ldots)$ this results in:

$$p(\underline{a}, k \mid \ldots) \propto \exp\left[\frac{-1}{2\sigma_e^2}(s(n)^T\underline{s}(n) - 2\underline{a}^T S\underline{s}(n) + \underline{a}^T S^T S\underline{a})\right] \times \exp\left[\frac{-(\underline{a}-\underline{\mu}_a)^T(\underline{a}-\underline{\mu}_a)}{2\sigma_a^2}\right] \tag{20}$$

which can be simplified to give:

$$p(\underline{a}, k \mid \ldots) \propto \exp\left[\frac{-1}{2}\left(\frac{\underline{s}(n)^T\underline{s}(n)}{\sigma_e^2} + \frac{\underline{\mu}_a^T\underline{\mu}_a}{\sigma_a^2} - 2\underline{a}^T\left[\frac{S\underline{s}(n)}{\sigma_e^2} + \frac{\underline{\mu}_a}{\sigma_a^2}\right] + \underline{a}^T\left[\frac{S^T S}{\sigma_e^2} + \frac{I}{\sigma_a^2}\right]\underline{a}\right)\right] \tag{21}$$

which is in the form of a standard Gaussian distribution having the following covariance matrix:

$$\sum_{\underline{a}} = \left[\frac{S^T S}{\sigma_e^2} + \frac{I}{\sigma_a^2}\right]^{-1} \tag{22}$$

The mean value of this Gaussian distribution can be determined by differentiating the exponent of equation (21) with respect to a and determining the value of a which makes the differential of the exponent equal to zero. This yields a mean value of:

$$\hat{\underline{\mu}}_a = \left[\frac{S^T S}{\sigma_e^2} + \frac{I}{\sigma_a^2}\right]^{-1} \left[\frac{S^T \underline{s}(n)}{\sigma_e^2} + \frac{\underline{\mu}_a}{\sigma_a^2}\right] \tag{23}$$

A sample can then be drawn from this standard Gaussian distribution to give $\underline{a}^g$ (where g is the $g^{th}$ iteration of the Gibbs sampler) with the model order ($k^g$) being determined by a model order selection routine which will be described later. The drawing of a sample from this Gaussian distribution may be done by using a random number generator which generates a vector of random values which are uniformly distributed and then using a transformation of random variables using the covariance matrix and the mean value given in equations (22) and (23) to generate the sample. In this embodiment, however, a random number generator is used which generates random numbers from a Gaussian distribution having zero mean and a variance of one. This simplifies the transformation process to one of a simple scaling using the covariance matrix given in equation (22) and shifting using the mean value given in equation (23). Since the techniques for drawing samples from Gaussian distributions are well known in the art of statistical analysis, a further description of them will not be given here. A more detailed description and explanation can be found in the book entitled "Numerical Recipes in C", by W. Press et al, Cambridge University Press, 1992 and in particular at chapter 7.

As those skilled in the art will appreciate, however, before a sample can be drawn from this Gaussian distribution, estimates of the raw speech samples must be available so that the matrix S and the vector $\underline{s}$(n) are known. The way in which these estimates of the raw speech samples are obtained in this embodiment will be described later.

A similar analysis for the conditional density p($\underline{h}$,r| . . . ) reveals that it also is a standard Gaussian distribution but having a covariance matrix and mean value given by:

$$\sum_{\underline{h}} = \left[\frac{Y^T Y}{\sigma_\varepsilon^2} + \frac{I}{\sigma_h^2}\right]^{-1} \quad \hat{\underline{\mu}}_h = \left[\frac{Y^T Y}{\sigma_\varepsilon^2} + \frac{I}{\sigma_h^2}\right]^{-1} \left[\frac{Y^T \underline{q}(n)}{\sigma_\varepsilon^2} + \frac{\underline{\mu}_h}{\sigma_h^2}\right] \tag{24}$$

from which a sample for $\underline{h}^g$ can be drawn in the manner described above, with the channel model order ($r^g$) being determined using the model order selection routine which will be described later.

A similar analysis for the conditional density $p(\sigma_e^2| \ldots)$ shows that:

$$p(\sigma_e^2 \mid \ldots) \propto (\sigma_e^2)^{-\frac{N}{2}} \exp\left[\frac{-E}{2\sigma_e^2}\right] \frac{(\sigma_e^2)^{-(\alpha_e+1)}}{\beta_e \Gamma(\alpha_e)} \exp\left[\frac{-1}{\sigma_e^2 \beta_e}\right] \tag{25}$$

where:

$$E = \underline{s}(n)^T \underline{s}(n) - 2\underline{a}^T S \underline{s}(n) + \underline{a}^T S^T S \underline{a}$$

which can be simplified to give:

$$p(\sigma_e^2 \mid \ldots) \propto (\sigma_e^2)^{-[(\frac{N}{2}+\alpha_e)+1]} \exp\left[\frac{-1}{\sigma_e^2}\left(\frac{E}{2} + \frac{1}{\beta_e}\right)\right] \tag{26}$$

which is also an Inverse Gamma distribution having the following parameters:

$$\hat{\alpha}_e = \frac{N}{2} + \alpha_e \text{ and } \hat{\beta}_e = \frac{2\beta_e}{2 + \beta_e \cdot E} \tag{27}$$

A sample is then drawn from this Inverse Gamma distribution by firstly generating a random number from a uniform distribution and then performing a transformation of random variables using the alpha and beta parameters given in equation (27), to give $(\sigma_e^2)^g$.

A similar analysis for the conditional density $p(\sigma_\epsilon^2| \ldots)$ reveals that it also is an Inverse Gamma distribution having the following parameters:

$$\hat{\alpha}_\varepsilon = \frac{N}{2} + \alpha_\varepsilon \text{ and } \hat{\beta}_\varepsilon = \frac{2\beta_\varepsilon}{2 + \beta_\varepsilon \cdot E^*} \tag{28}$$

where:

$$E^* = \underline{q}(n)^T \underline{q}(n) - 2\underline{h}^T \underline{q}(n) + \underline{h}^T Y^T Y \underline{h}$$

A sample is then drawn from this Inverse Gamma distribution in the manner described above to give $(\sigma_\epsilon^2)^g$.

A similar analysis for conditional density $p(\sigma_a^2| \ldots)$ reveals that it too is an Inverse Gamma distribution having the following parameters:

$$\hat{\alpha}_a = \frac{N}{2} + \alpha_a \text{ and } \hat{\beta}_a = \frac{2\beta_a}{2 + \beta_a \cdot (\underline{a} - \underline{\mu}_a)^T (\underline{a} - \underline{\mu}_a)} \tag{29}$$

A sample is then drawn from this Inverse Gamma distribution in the manner described above to give $(\sigma_a^2)^g$.

Similarly, the conditional density $p(\sigma_h^2| \ldots)$ is also an Inverse Gamma distribution but having the following parameters:

$$\hat{\alpha}_h = \frac{N}{2} + \alpha_h \text{ and } \hat{\beta}_h = \frac{2\beta_h}{2 + \beta_h \cdot (\underline{h} - \underline{\mu}_h)^T (\underline{h} - \underline{\mu}_h)} \tag{30}$$

A sample is then drawn from this Inverse Gamma distribution in the manner described above to give $(\sigma_h^2)^g$.

As those skilled in the art will appreciate, the Gibbs sampler requires an initial transient period to converge to equilibrium (known as burn-in). Eventually, after L iterations, the sample ($\underline{a}^L$, $k^L$, $\underline{h}^L$, $r^L$, $(\sigma_e^2)^L$, $\sigma_\epsilon^2)^L$, $(\sigma_a^2)^L$, $(\sigma_h^2)^L$, $s(n)^L$) is considered to be a sample from the joint probability density function defined in equation (19). In this embodiment, the Gibbs sampler performs approximately one hundred and fifty (150) iterations on each frame of input speech and discards the samples from the first fifty iterations and uses the rest to give a picture (a set of histograms) of what the joint probability density function defined in equation (19) looks like. From these histograms, the set of AR coefficients ($\underline{a}$) which best represents the observed speech samples ($\underline{y}$(n)) from the analogue to digital converter 17 are determined. The histograms are also used to determine appropriate values for the variances and channel model coefficients ($\underline{h}$) which can be used as the initial values for the Gibbs sampler when it processes the next frame of speech.

Model Order Selection

As mentioned above, during the Gibbs iterations, the model order (k) of the AR filter and the model order (r) of the channel filter are updated using a model order selection routine. In this embodiment, this is performed using a technique derived from "Reversible jump Markov chain Monte Carlo computation", which is described in the paper entitled "Reversible jump Markov chain Monte Carlo computation and Bayesian model determination" by Peter Green, Biometrika, vol 82, pp 711 to 732, 1995.

Figure 4:
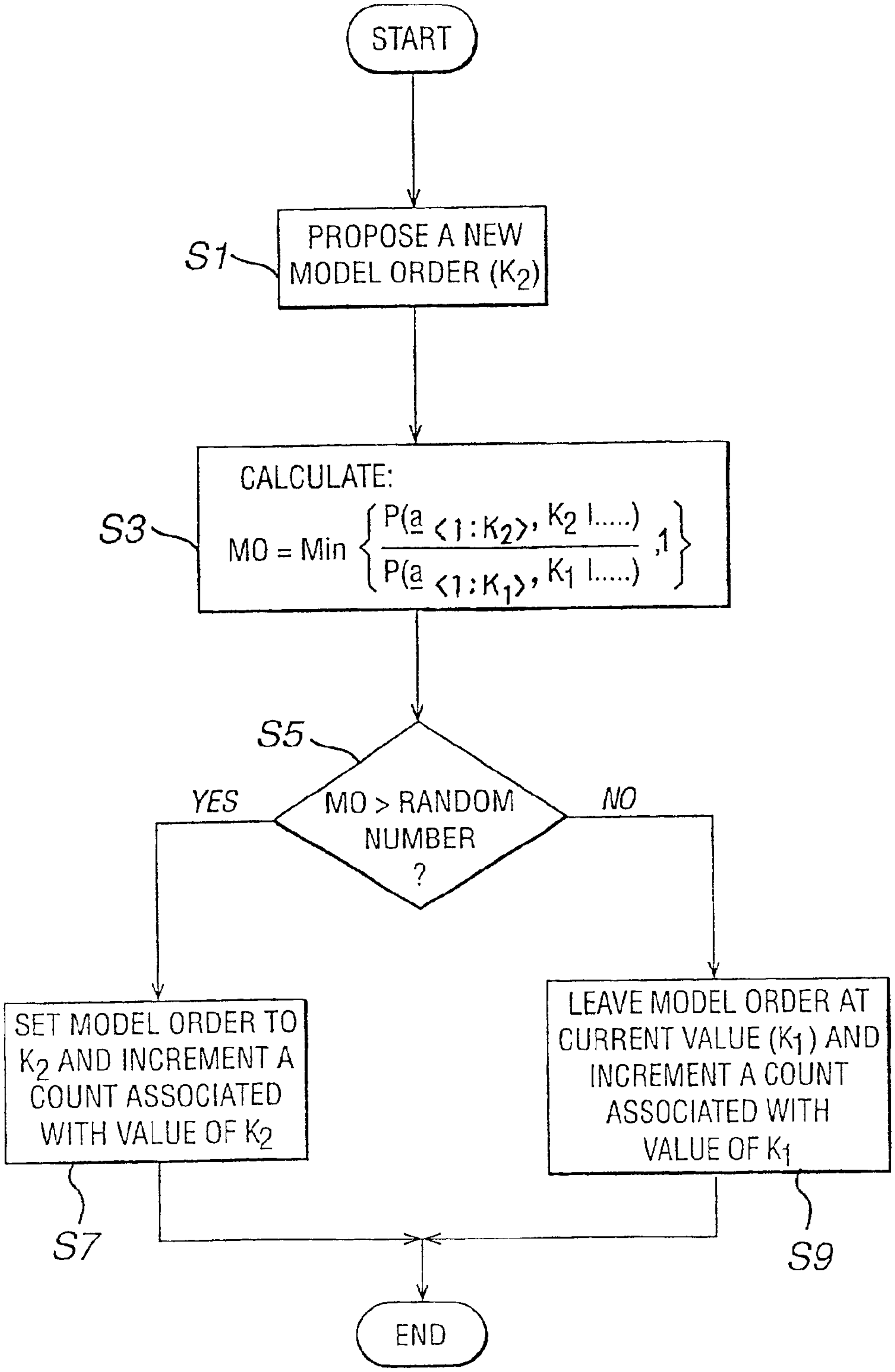
FIG. 4 is a flow chart illustrating the processing steps performed by a model order selection unit forming part of the statistical analysis unit shown in FIG. 2.

FIG. 4 is a flow chart which illustrates the processing steps performed during this model order selection routine for the AR filter model order (k). As shown, in step s1, a new model order ($k_2$) is proposed. In this embodiment, the new model order will normally be proposed as $k_2=k_1\pm 1$, but occasionally it will be proposed as $k_2=k_1\pm 2$ and very occasionally as $k_2=k_1\pm 3$ etc. To achieve this, a sample is drawn from a discretised Laplacian density function centred on the current model order ($k_1$) and with the variance of this Laplacian density function being chosen a priori in accordance with the degree of sampling of the model order space that is required.

The processing then proceeds to step s3 where a model order variable (MO) is set equal to:

$$MO = \max\left\{\frac{p(\underline{a}_{\langle 1:k_2\rangle}, k_2 \mid \ldots)}{p(\underline{a}_{\langle 1:k_1\rangle}, k_1 \mid \ldots)}, 1\right\} \tag{31}$$

where the ratio term is the ratio of the conditional probability given in equation (21) evaluated for the current AR filter coefficients (a) drawn by the Gibbs sampler for the current model order (($k_1$)) and for the proposed new model order ($k_2$). If $k_2>k_1$, then the matrix S must first be resized and then a new sample must be drawn from the Gaussian distribution having the mean vector and covariance matrix defined by equations (22) and (23) (determined for the resized matrix S), to provide the AR filter coefficients ($\underline{a}_{<1:k2>}$) for the new model order ($k_2$). If $k_2<k_1$ then all that is required is to delete the last ($k_1-k_2$) samples from the a vector. If the ratio in equation (31) is greater than one, then this implies that the proposed model order ($k_2$) is better than the current model order whereas if it is less than one then this implies that the current model order is better than the proposed model order. However, since occasionally this will not be the case, rather than deciding whether or not to accept the proposed model order by comparing the model order variable (MO) with a fixed threshold of one, in this embodiment, the model order variable (MO) is compared, in step s5, with a random number which lies between zero and one. If the model order variable (MO) is greater than this random number, then the processing proceeds to step s7 where the model order is set to the proposed model order ($k_2$) and a count associated with the value of $k_2$ is incremented. If, on the other hand, the model order variable (MO) is smaller than the random number, then the processing proceeds to step s9 where the current model order is maintained and a count associated with the value of the current model order ($k_1$) is incremented. The processing then ends.

This model order selection routine is carried out for both the model order of the AR filter model and for the model order of the channel filter model. This routine may be carried out at each Gibbs iteration. However, this is not essential. Therefore, in this embodiment, this model order updating routine is only carried out every third Gibbs iteration.

Simulation Smoother

As mentioned above, in order to be able to draw samples using the Gibbs sampler, estimates of the raw speech samples are required to generate $\underline{s}$(n), S and Y which are used in the Gibbs calculations. These could be obtained from the conditional probability density function $p(\underline{s}(n)| \ldots)$. However, this is not done in this embodiment because of the high dimensionality of $\underline{s}$(n). Therefore, in this embodiment, a different technique is used to provide the necessary estimates of the raw speech samples. In particular, in this embodiment, a "Simulation Smoother" is used to provide these estimates. This Simulation Smoother was proposed by Piet de Jong in the paper entitled "The Simulation Smoother for Time Series Models", Biometrika (1995), vol 82, 2, pages 339 to 350. As those skilled in the art will appreciate, the Simulation Smoother is run before the Gibbs Sampler. It is also run again during the Gibbs iterations in order to update the estimates of the raw speech samples. In this embodiment, the Simulation Smoother is run every fourth Gibbs iteration.

In order to run the Simulation Smoother, the model equations defined above in equations (4) and (6) must be written in "state space" format as follows:

$$\hat{\underline{s}}(n)=\tilde{A}\cdot\hat{\underline{s}}(n-1)+\hat{\underline{e}}(n)$$

$$y(n)=\underline{h}^T\cdot\hat{\underline{s}}(n-1)+\epsilon(n) \tag{32}$$

where $$\tilde{A} = \begin{bmatrix} a_1 & a_2 & a_2 & \ldots & a_k & 0 & \ldots & 0 \\ 1 & 0 & 0 & \ldots & 0 & 0 & \ldots & 0 \\ 0 & 1 & 0 & \ldots & 0 & 0 & \ldots & 0 \\ \vdots & & & \ddots & & & & \\ 0 & & & & & & 1 & 0 \end{bmatrix}_{r\times r}$$

and $$\hat{s}(n) = \begin{bmatrix} \hat{s}(n) \\ \hat{s}(n-1) \\ \hat{s}(n-2) \\ \vdots \\ \hat{s}(n-r+1) \end{bmatrix}_{r\times 1} \qquad \hat{\underline{e}}(n) = \begin{bmatrix} \hat{e}(n) \\ 0 \\ 0 \\ \vdots \\ 0 \end{bmatrix}_{r\times 1}$$

With this state space representation, the dimensionality of the raw speech vectors ($\hat{\underline{s}}$(n)) and the process noise vectors ($\hat{\underline{e}}$(n)) do not need to be N×1 but only have to be as large as the greater of the model orders—k and r. Typically, the channel model order (r) will be larger than the AR filter model order (k). Hence, the vector of raw speech samples ($\hat{\underline{s}}$(n)) and the vector of process noise ($\hat{\underline{e}}$ (n)) only need to be r×1 and hence the dimensionality of the matrix $\hat{A}$ only needs to be r×r.

Figure 5:
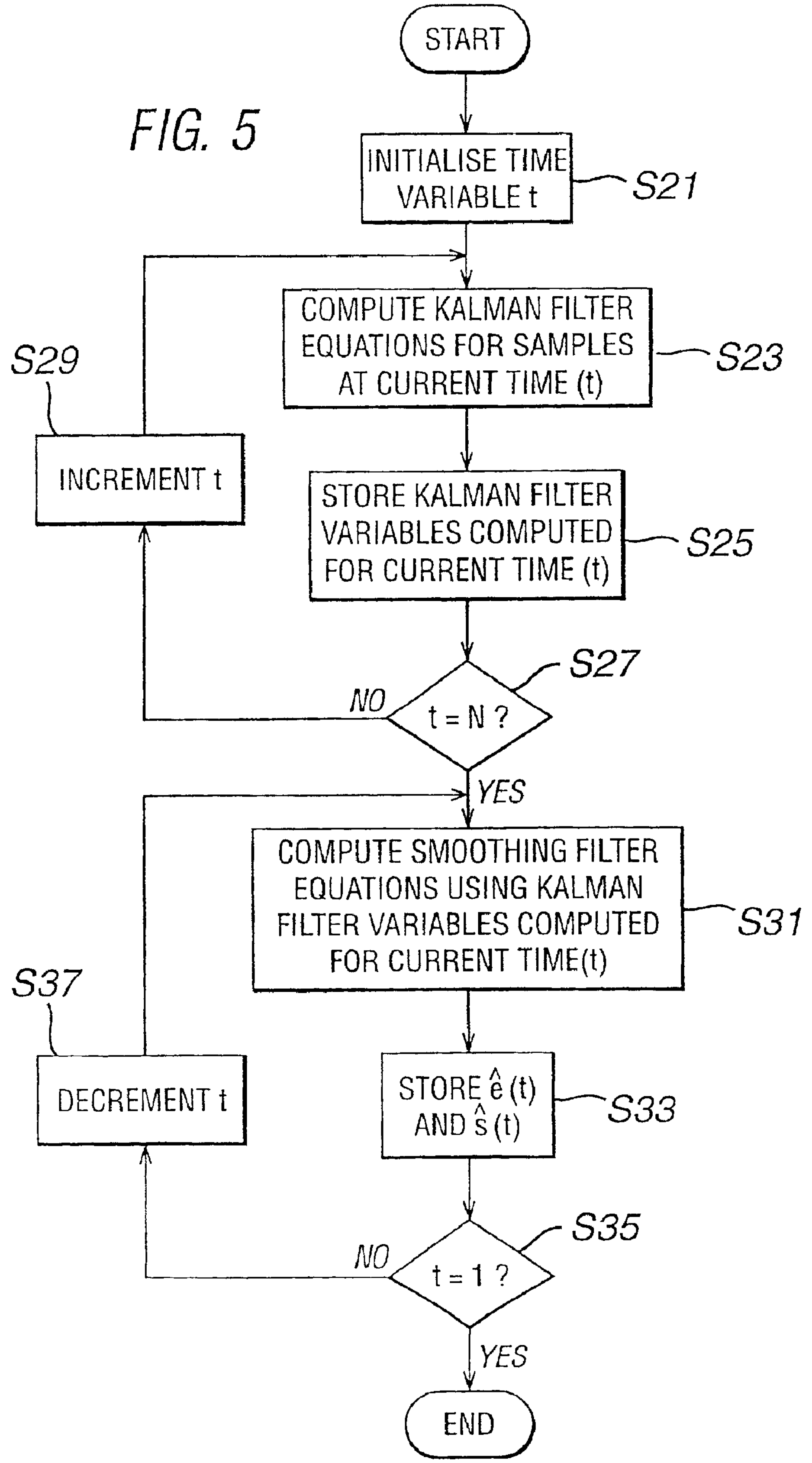
FIG. 5 is a flow chart illustrating the main processing steps employed by a Simulation Smoother which forms part of the statistical analysis unit shown in FIG. 2.

The Simulation Smoother involves two stages—a first stage in which a Kalman filter is run on the speech samples in the current frame and then a second stage in which a "smoothing" filter is run on the speech samples in the current frame using data obtained from the Kalman filter stage. FIG. 5 is a flow chart illustrating the processing steps performed by the Simulation Smoother. As shown, in step s21, the system initialises a time variable t to equal one. During the Kalman filter stage, this time variable is run from t=1 to N in order to process the N speech samples in the current frame being processed in time sequential order. After step s21, the processing then proceeds to step s23, where the following Kalman filter equations are computed for the current speech sample (y(t)) being processed:

$$w(t)=y(t)-\underline{h}^T\hat{\underline{s}}(t)$$

$$d(t)=\underline{h}^TP(t)\underline{h}+\sigma_\epsilon^2$$

$$\underline{k}_f(t)=(\tilde{A}P(t)\underline{h})\cdot d(t)^{-1}$$

$$\hat{\underline{s}}(t+1)=\tilde{A}\hat{\underline{s}}(t)+\underline{k}_f(t)\cdot w(t)$$

$$L(t)=\tilde{A}-\underline{k}_f(t)\cdot\underline{h}^T$$

$$P(t+1)=\tilde{A}P(t)L(t)^T+\sigma_e^2\cdot I \tag{33}$$

where the initial vector of raw speech samples ($\hat{\underline{s}}(1)$) includes raw speech samples obtained from the processing of the previous frame (or if there are no previous frames then s(i) is set equal to zero for i<1); P(1) is the variance of $\hat{\underline{s}}(1)$ (which can be obtained from the previous frame or initially can be set to $\sigma_e^2$); $\underline{h}$ is the current set of channel model coefficients which can be obtained from the processing of the previous frame (or if there are no previous frames then the elements of h can be set to their expected values~zero); y(t) is the current speech sample of the current frame being processed and I is the identity matrix. The processing then proceeds to step s25 where the scalar values w(t) and d(t) are stored together with the r×r matrix L(t) (or alternatively the Kalman filter gain vector $k_f(t)$ could be stored from which L(t) can be generated). The processing then proceeds to step s27 where the system determines whether or not all the speech samples in the current frame have been processed. If they have not, then the processing proceeds to step s29 where the time variable t is incremented by one so that the next sample in the current frame will be processed in the same way. Once all N samples in the current frame have been processed in this way and the corresponding values stored, the first stage of the Simulation Smoother is complete.

The processing then proceeds to step s31 where the second stage of the Simulation Smoother is started in which the smoothing filter processes the speech samples in the current frame in reverse sequential order. As shown, in step s31 the system runs the following set of smoothing filter equations on the current speech sample being processed together with the stored Kalman filter variables computed for the current speech sample being processed:

$$C(t)=\sigma_e^2(I-\sigma_e^2U(t))$$

$$\underline{\eta}(t)\sim N(0,C(t))$$

$$V(t)=\sigma_e^2U(t)L(t)$$

$$\underline{r}(t-1)=\underline{h}d(t)^{-1}w(t)+L(t)^T\underline{r}(t)-V(t)^TC(t)^{-1}\underline{\eta}(t)$$

$$U(t-1)=\underline{h}d(t)^{-1}\underline{h}^T+L(t)^TU(t)L(t)+V(t)^TC(t)^{-1}V(t)$$

$$\tilde{\underline{e}}(t)=\sigma_e^2\underline{r}(t)+\underline{\eta}(t) \text{ where } \tilde{\underline{e}}(t)=[\tilde{e}(t)\tilde{e}(t-1)\tilde{e}(t-2)\ \ldots\ \tilde{e}(t-r+1)]^T$$

$$\hat{\underline{s}}(t)=\tilde{A}\hat{\underline{s}}(^{t-}1)+\hat{\underline{e}}(t) \text{ where } \hat{\underline{s}}(t)=[\hat{s}(t)\hat{s}(t-1)\hat{s}(t-2)\ \ldots\ \hat{s}(t-r+1)]^T$$

$$\text{and } \hat{\underline{e}}(t)=[\tilde{e}(t)\ 0\ 0\ \ldots\ 0]^T \tag{34}$$

where $\underline{\eta}(t)$ is a sample drawn from a Gaussian distribution having zero mean and covariance matrix C(t); the initial vector $\underline{r}$(t=N) and the initial matrix U(t=N) are both set to zero; and $\underline{s}(0)$ is obtained from the processing of the previous frame (or if there are no previous frames can be set equal to zero). The processing then proceeds to step s33 where the estimate of the process noise ($\tilde{e}(t)$) for the current speech sample being processed and the estimate of the raw speech sample ($\hat{s}(t)$) for the current speech sample being processed are stored. The processing then proceeds to step s35 where the system determines whether or not all the speech samples in the current frame have been processed. If they have not, then the processing proceeds to step s37 where the time variable t is decremented by one so that the previous sample in the current frame will be processed in the same way. Once all N samples in the current frame have been processed in this way and the corresponding process noise and raw speech samples have been stored, the second stage of the Simulation Smoother is complete and an estimate of $\underline{s}(n)$ will have been generated.

As shown in equations (4) and (8), the matrix S and the matrix Y require raw speech samples s(n−N−1) to s(n−N−k+1) and s(n−N−1) to s(n−N−r+1) respectively in addition to those in $\underline{s}(n)$. These additional raw speech samples can be obtained either from the processing of the previous frame of speech or if there are no previous frames, they can be set to zero. With these estimates of raw speech samples, the Gibbs sampler can be run to draw samples from the above described probability density functions.

Statistical Analysis Unit—Operation

A description has been given above of the theory underlying the statistical analysis unit 21. A description will now be given with reference to FIGS. 6 to 8 of the operation of the statistical analysis unit 21.

Figure 6:
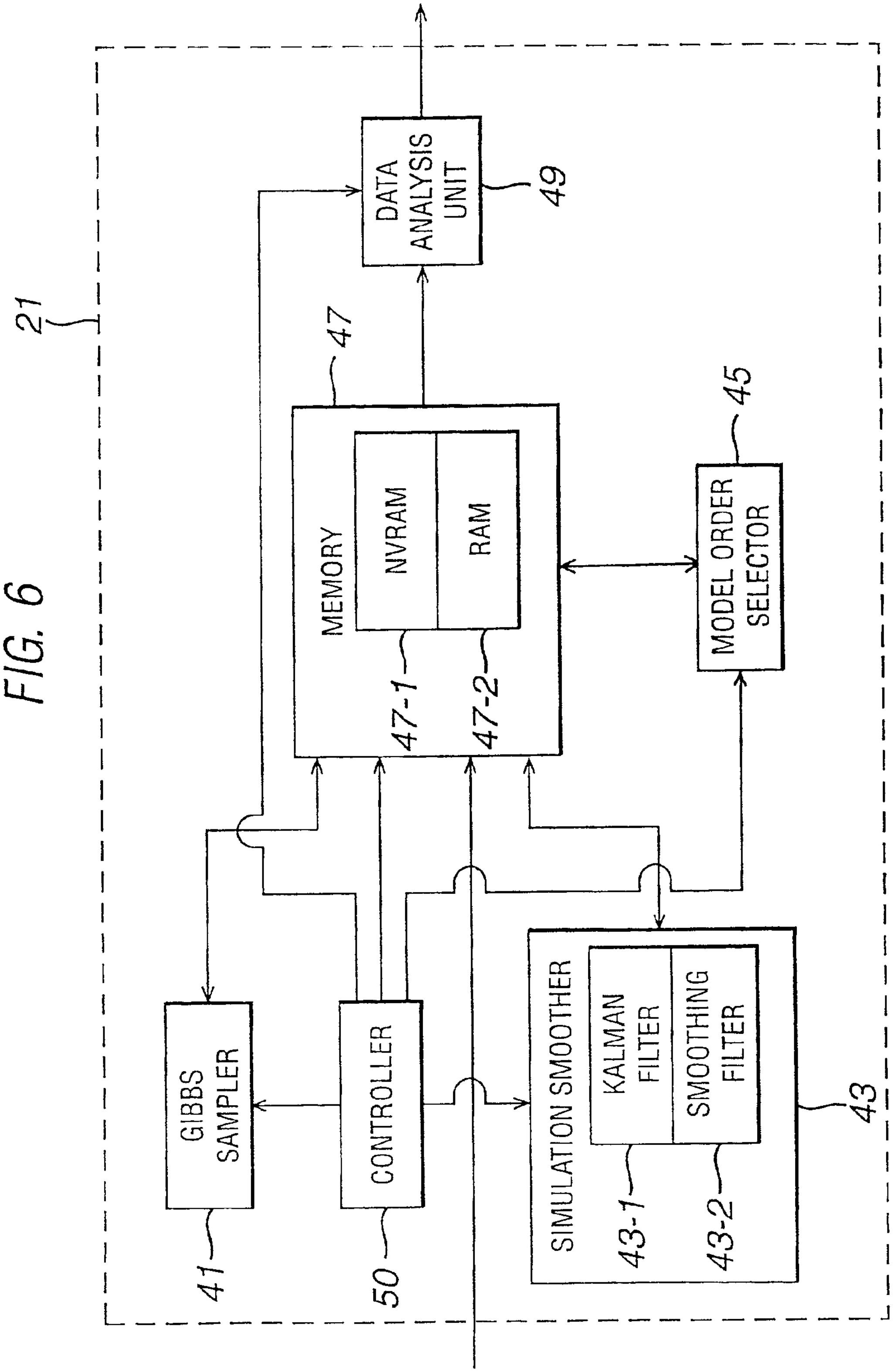
FIG. 6 is a block diagram illustrating the main processing components of the statistical analysis unit shown in FIG. 2.

FIG. 6 is a block diagram illustrating the principal components of the statistical analysis unit 21 of this embodiment. As shown, it comprises the above described Gibbs sampler 41, Simulation Smoother 43 (including the Kalman filter 43-1 and smoothing filter 43-2) and model order selector 45. It also comprises a memory 47 which receives the speech samples of the current frame to be processed, a data analysis unit 49 which processes the data generated by the Gibbs sampler 41 and the model order selector 45 and a controller 50 which controls the operation of the statistical analysis unit 21.

As shown in FIG. 6, the memory 47 includes a non volatile memory area 47-1 and a working memory area 47-2. The non volatile memory 47-1 is used to store the joint probability density function given in equation (19) above and the equations for the variances and mean values and the equations for the Inverse Gamma parameters given above in equations (22) to (24) and (27) to (30) for the above mentioned conditional probability density functions for use by the Gibbs sampler 41. The non volatile memory 47-1 also stores the Kalman filter equations given above in equation (33) and the smoothing filter equations given above in equation 34 for use by the Simulation Smoother 43.

Figure 7:
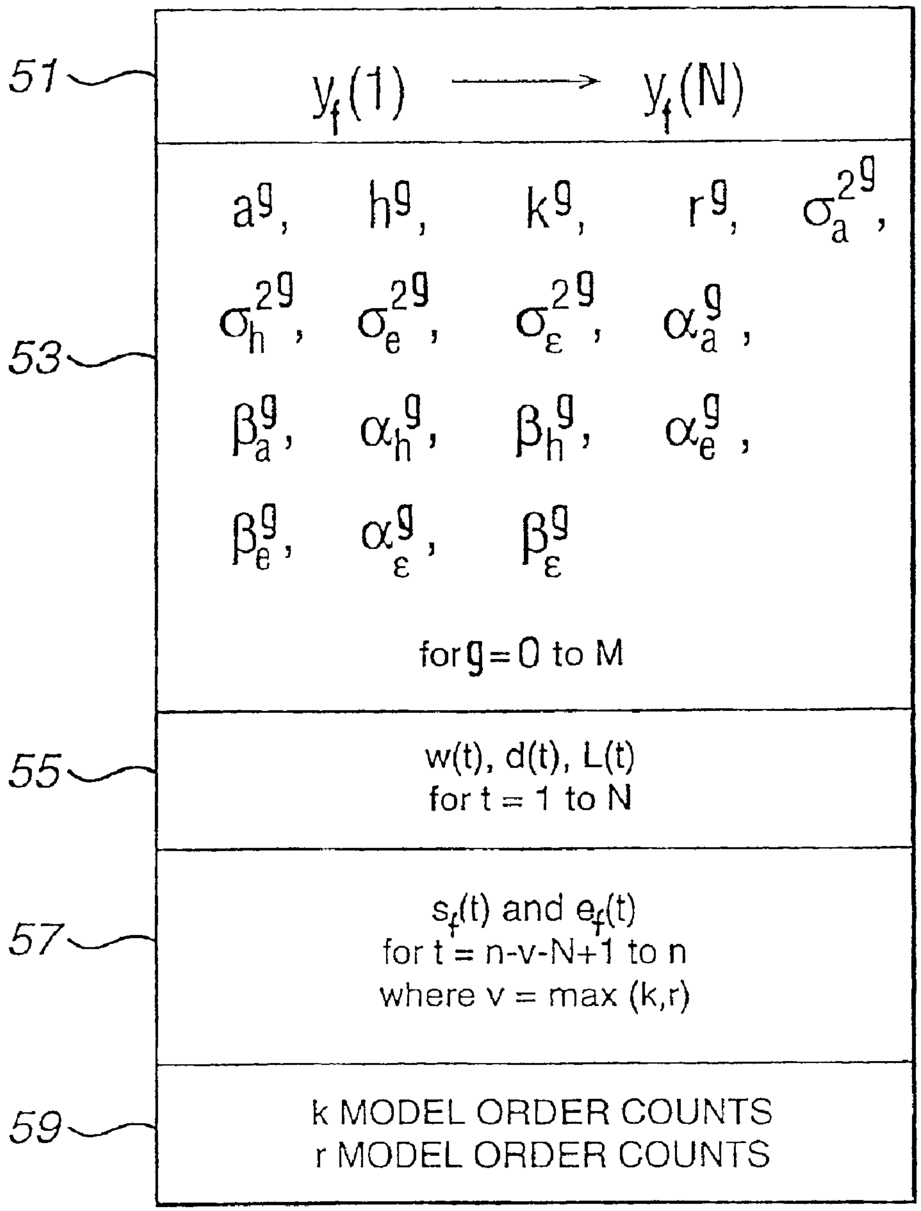
FIG. 7 is a memory map illustrating the data that is stored in a memory which forms part of the statistical analysis unit shown in FIG. 2.

FIG. 7 is a schematic diagram illustrating the parameter values that are stored in the working memory area (RAM) 47-2. As shown, the RAM includes a store 51 for storing the speech samples $y_f$ (1) to $y_f$ (N) output by the analogue to digital converter 17 for the current frame (f) being processed. As mentioned above, these speech samples are used in both the Gibbs sampler 41 and the Simulation Smoother 43. The RAM 47-2 also includes a store 53 for storing the initial estimates of the model parameters (g=0) and the M samples (g=1 to M) of each parameter drawn from the above described conditional probability density functions by the Gibbs sampler 41 for the current frame being processed. As mentioned above, in this embodiment, M is 100 since the Gibbs sampler 41 performs 150 iterations on each frame of input speech with the first fifty samples being discarded. The RAM 47-2 also includes a store 55 for storing W(t), d(t) and L(t) for t=1 to N which are calculated during the processing of the speech samples in the current frame of speech by the above described Kalman filter 43-1. The RAM 47-2 also includes a store 57 for storing the estimates of the raw speech samples ($\hat{s}_f(t)$) and the estimates of the process noise ($\tilde{e}_f(t)$) generated by the smoothing filter 43-2, as discussed above. The RAM 47-2 also includes a store 59 for storing the model order counts which are generated by the model order selector 45 when the model orders for the AR filter model and the channel model are updated.

Figure 8:
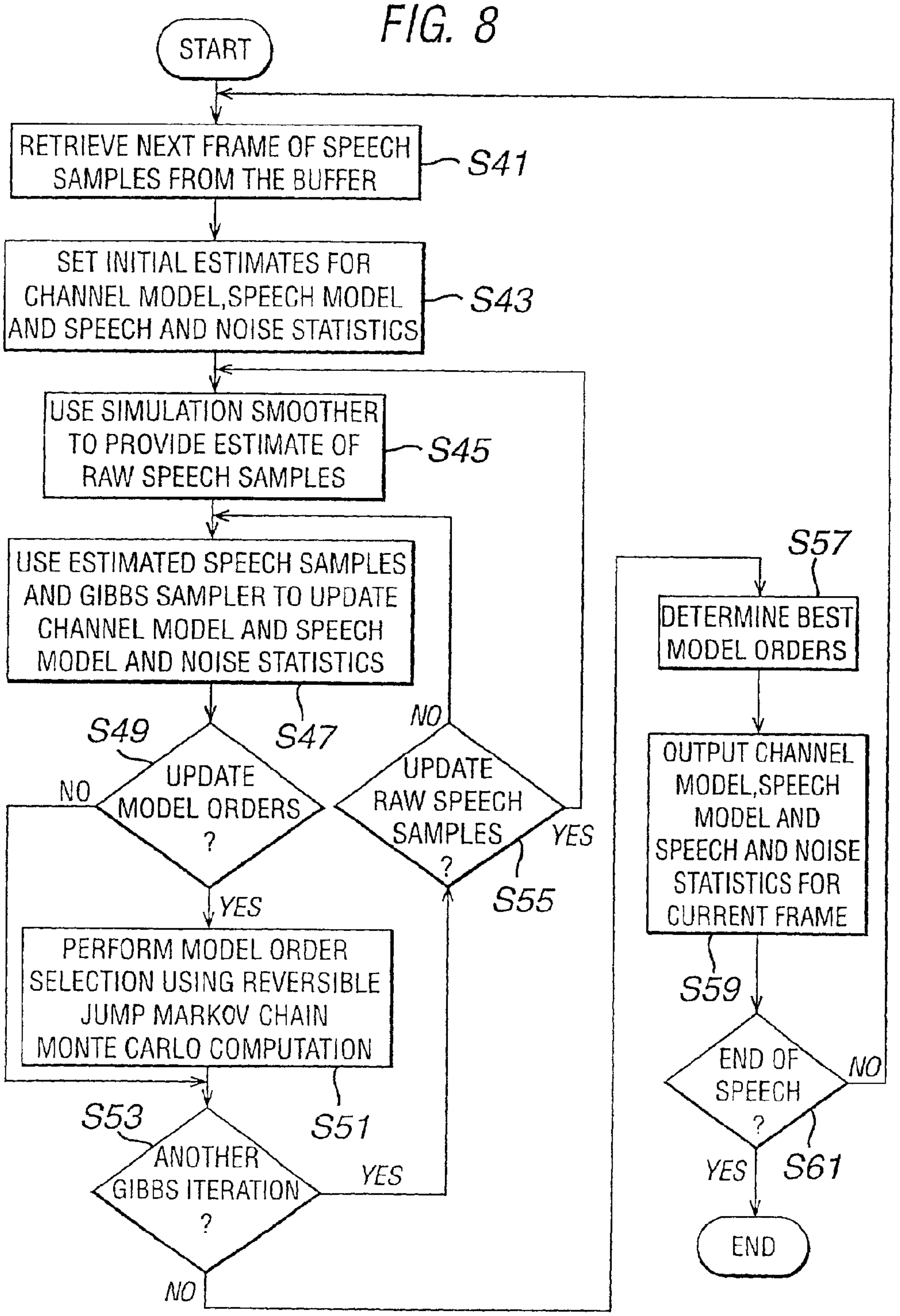
FIG. 8 is a flow chart illustrating the main processing steps performed by the statistical analysis unit shown in FIG. 6.

FIG. 8 is a flow diagram illustrating the control program used by the controller 50, in this embodiment, to control the processing operations of the statistical analysis unit 21. As shown, in step s41, the controller 50 retrieves the next frame of speech samples to be processed from the buffer 19 and stores them in the memory store 51. The processing then proceeds to step s43 where initial estimates for the channel model, raw speech samples and the process noise and measurement noise statistics are set and stored in the store 53. These initial estimates are either set to be the values obtained during the processing of the previous frame of speech or, where there are no previous frames of speech, are set to their expected values (which may be zero). The processing then proceeds to step s45 where the Simulation Smoother 43 is activated so as to provide an estimate of the raw speech samples in the manner described above. The processing then proceeds to step s47 where one iteration of the Gibbs sampler 41 is run in order to update the channel model, speech model and the process and measurement noise statistics using the raw speech samples obtained in step s45. These updated parameter values are then stored in the memory store 53.

The processing then proceeds to step s49 where the controller 50 determines whether or not to update the model orders of the AR filter model and the channel model. As mentioned above, in this embodiment, these model orders are updated every third Gibbs iteration. If the model orders are to be updated, then the processing proceeds to step s51 where the model order selector 45 is used to update the model orders of the AR filter model and the channel model in the manner described above. If at step s49 the controller 50 determines that the model orders are not to be updated, then the processing skips step s51 and the processing proceeds to step s53. At step s53, the controller 50 determines whether or not to perform another Gibbs iteration. If another iteration is to be performed, then the processing proceeds to decision block s55 where the controller 50 decides whether or not to update the estimates of the raw speech samples (s(t)). If the raw speech samples are not to be updated, then the processing returns to step s47 where the next Gibbs iteration is run.

As mentioned above, in this embodiment, the Simulation Smoother 43 is run every fourth Gibbs iteration in order to update the raw speech samples. Therefore, if the controller 50 determines, in step s55 that there has been four Gibbs iterations since the last time the speech samples were updated, then the processing returns to step s45 where the Simulation Smoother is run again to provide new estimates of the raw speech samples (s(t)). Once the controller 50 has determined that the required 150 Gibbs iterations have been performed, the controller 50 causes the processing to proceed to step s57 where the data analysis unit 49 analyses the model order counts generated by the model order selector 45 to determine the model orders for the AR filter model and the channel model which best represents the current frame of speech being processed. The processing then proceeds to step s59 where the data analysis unit 49 analyses the samples drawn from the conditional densities by the Gibbs sampler 41 to determine the AR filter coefficients ($\underline{a}$), the channel model coefficients ($\underline{h}$), the variances of these coefficients and the process and measurement noise variances which best represent the current frame of speech being processed. The processing then proceeds to step s61 where the controller 50 determines whether or not there is any further speech to be processed. If there is more speech to be processed, then processing returns to step S41 and the above process is repeated for the next frame of speech. Once all the speech has been processed in this way, the processing ends.

Data Analysis Unit

Figure 9A:
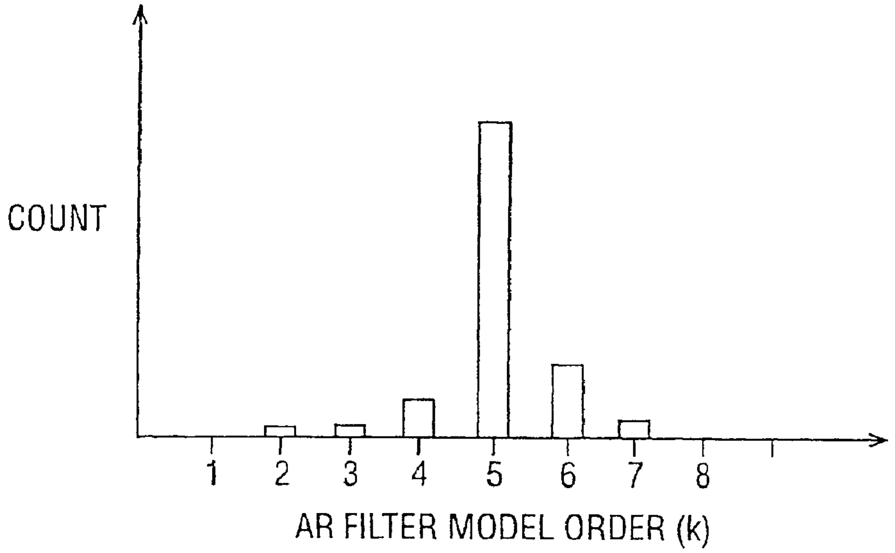
FIG. 9*a* is a histogram for a model order of an auto regressive filter model which forms part of the model shown in FIG. 3.

A more detailed description of the data analysis unit 49 will now be given with reference to FIG. 9. As mentioned above, the data analysis unit 49 initially determines, in step s57, the model orders for both the AR filter model and the channel model which best represents the current frame of speech being processed. It does this using the counts that have been generated by the model order selector 45 when it was run in step s51. These counts are stored in the store 59 of the RAM 47-2. In this embodiment, in determining the best model orders, the data analysis unit 49 identifies the model order having the highest count. FIG. 9*a* is an exemplary histogram which illustrates the distribution of counts that is generated for the model order (k) of the AR filter model. Therefore, in this example, the data analysis unit 49 would set the best model order of the AR filter model as five. The data analysis unit 49 performs a similar analysis of the counts generated for the model order (r) of the channel model to determine the best model order for the channel model.

Figure 9B:
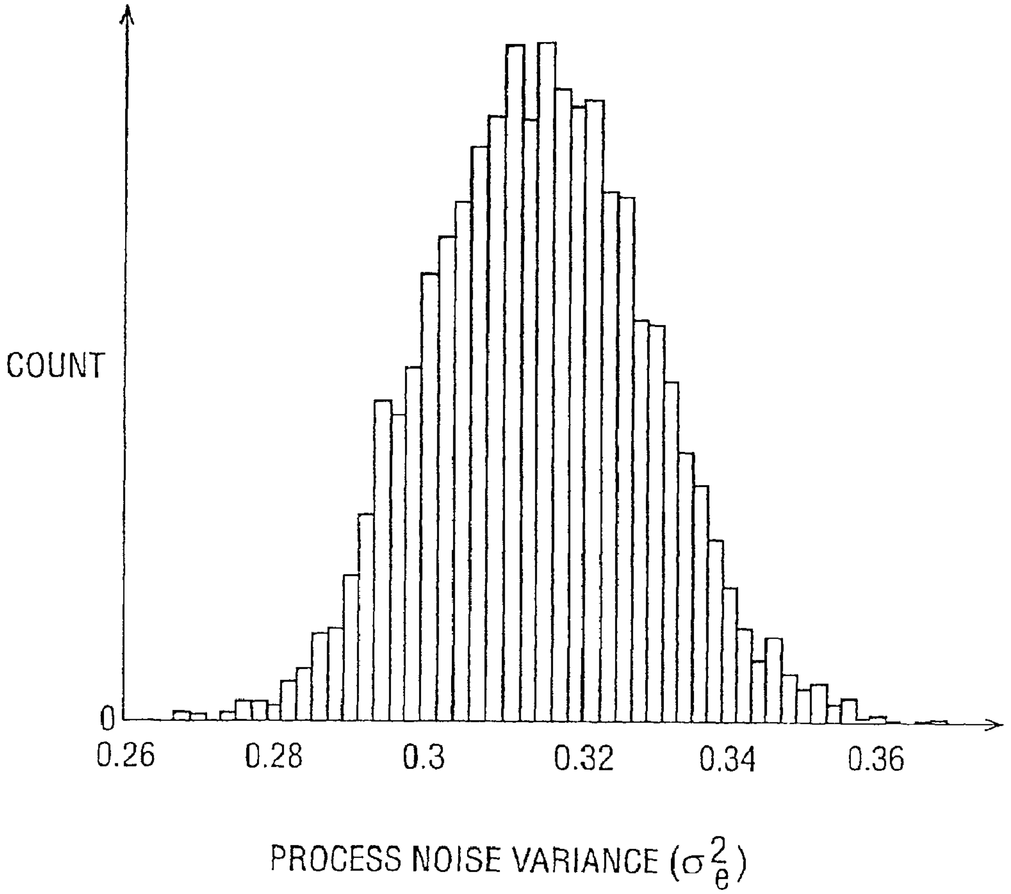
FIG. 9*b* is a histogram for the variance of process noise modelled by the model shown in FIG. 3.

Once the data analysis unit 49 has determined the best model orders (k and r), it then analyses the samples generated by the Gibbs sampler 41 which are stored in the store 53 of the RAM 47-2, in order to determine parameter values that are most representative of those samples. It does this by determining a histogram for each of the parameters from which it determines the most representative parameter value. To generate the histogram, the data analysis unit 49 determines the maximum and minimum sample value which was drawn by the Gibbs sampler and then divides the range of parameter values between this minimum and maximum value into a predetermined number of sub-ranges or bins. The data analysis unit 49 then assigns each of the sample values into the appropriate bins and counts how many samples are allocated to each bin. It then uses these counts to calculate a weighted average of the samples (with the weighting used for each sample depending on the count for the corresponding bin), to determine the most representative parameter value (known as the minimum mean square estimate (MMSE)). FIG. 9*b* illustrates an example histogram which is generated for the variance ($\sigma_e^2$) of the process noise, from which the data analysis unit 49 determines that the variance representative of the sample is 0.3149.

Figure 9C:
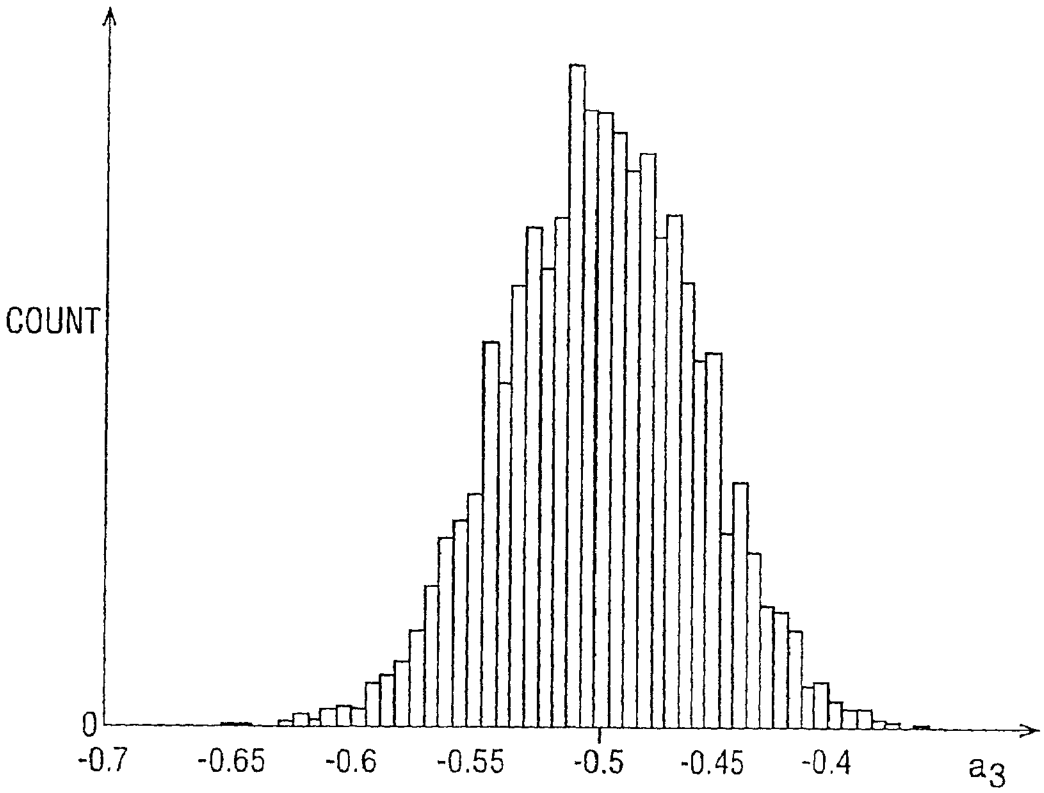
FIG. 9*c* is a histogram for a third coefficient of the AR filter model.

In determining the AR filter coefficients ($a_i$ for i=i to k), the data analysis unit 49 determines and analyses a histogram of the samples for each coefficient independently. FIG. 9*c* shows an exemplary histogram obtained for the third AR filter coefficient ($a_3$), from which the data analysis unit 49 determines that the coefficient representative of the samples is −0.4977.

In this embodiment, the data analysis unit 49 only outputs the AR filter coefficients which are passed to the coefficient convertor 23 shown in FIG. 2. The remaining parameter values determined by the data analysis unit 49 are stored in the RAM 47-2 for use during the processing of the next frame of speech. As mentioned above, the AR filter coefficients output by the statistical analysis unit 21 are input to the coefficient convertor 23 which converts these coefficients into cepstral coefficients which are then compared with stored speech models 27 by the speech recognition unit 25 in order to generate a recognition result.

As the skilled reader will appreciate, a speech processing technique has been described above which uses statistical analysis techniques to determine sets of AR filter coefficients representative of an input speech signal. The technique is more robust and accurate than prior art techniques which employ maximum likelihood estimators to determine the AR filter coefficients. This is because the statistical analysis of each frame uses knowledge obtained from the processing of the previous frame. In addition, with the analysis performed above, the model order for the AR filter model is not assumed to be constant and can vary from frame to frame. In this way, the optimum number of AR filter coefficients can be used to represent the speech within each frame. As a result, the AR filter coefficients output by the statistical analysis unit 21 will more accurately represent the corresponding input speech. Further still, since the underlying process model that is used separates the speech source from the channel, the AR filter coefficients that are determined will be more representative of the actual speech and will be less likely to include distortive effects of the channel.

Further still, since variance information is available for each of the parameters, this provides an indication of the confidence of each of the parameter estimates. This is in contrast to maximum likelihood and least square approaches, such as linear prediction analysis, where point estimates of the parameter values are determined.

Multi Speaker Multi Microphone

A description will now be given of a multi speaker and multi microphone system which uses a similar statistical analysis to separate and model the speech from each speaker. Again, to facilitate understanding, a description will initially be given of a two speaker and two microphone system before generalising to a multi speaker and multi microphone system.

Figure 10:
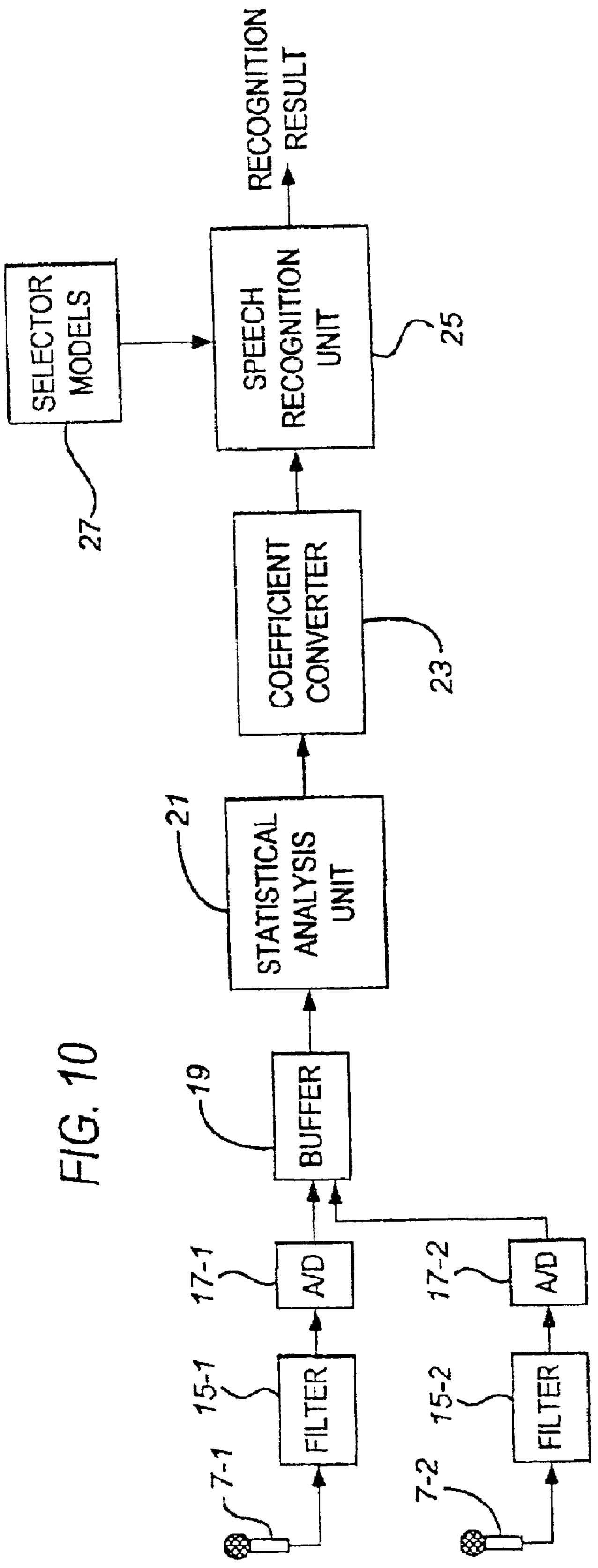
FIG. 10 is a block diagram illustrating the principal components of a speech recognition system embodying the present invention.

FIG. 10 is a schematic block diagram illustrating a speech recognition system which employs a statistical analysis unit embodying the present invention. As shown, the system has two microphones 7-1 and 7-2 which convert, in this embodiment, the speech from two speakers (not shown) into equivalent electrical signals which are passed to a respective filter circuit 15-1 and 15-2. In this embodiment, the filters 15 remove frequencies above 8 kHz since the filtered signals are then converted into corresponding digital signals at a sampling rate of 16 kHz by a respective analogue to digital converter 17-1 and 17-2. The digitized speech samples from the analogue to digital converters 17 are then fed into the buffer 19. The statistical analysis unit 21 analyses the speech within successive frames of the input speech signal from the two microphones. In this embodiment, since there are two microphones there are two sequences of frames which are to be processed. In this embodiment, the two frame sequences are processed together so that the frame of speech from microphone 7-1 at time t is processed with the frame of speech received from the microphone 7-2 at time t. Again, in this embodiment, the frames of speech are non-overlapping and have a duration of 20 ms which, with the 16 kHz sampling rate of the analogue to digital converters 17, results in the statistical analysis unit 21 processing blocks of 640 speech samples (corresponding to two frames of 320 samples).

Figure 11:
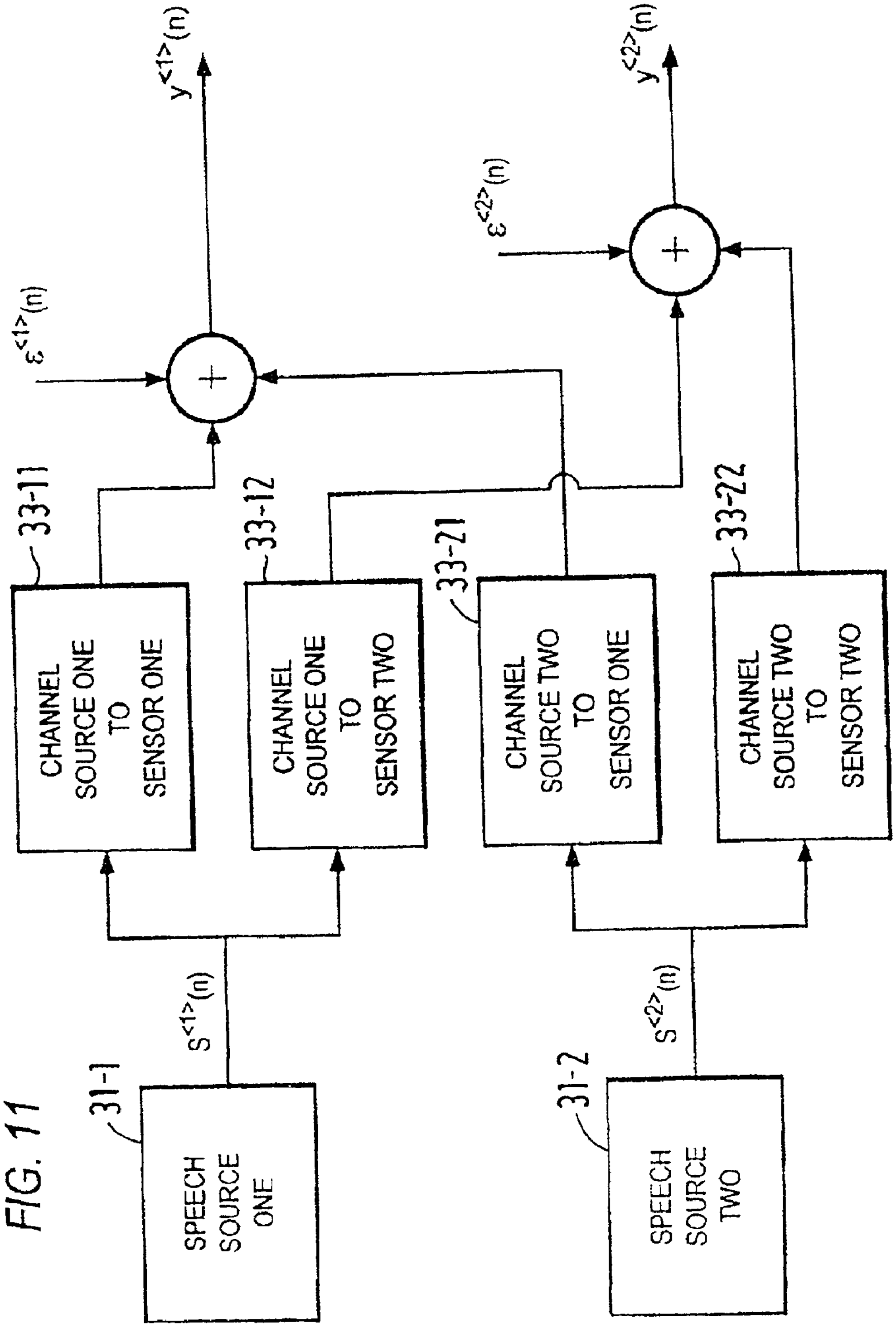
FIG. 11 is a block diagram representing a model employed by a statistical analysis unit which forms part of the speech recognition system shown in FIG. 10.

In order to perform the statistical analysis on the input speech, the analysis unit 21 assumes that there is an underlying process similar to that of the single speaker single microphone system described above. The particular model used in this embodiment is illustrated in FIG. 11. As shown, the process is modelled by two speech sources 31-1 and 31-2 which generate, at time t=n, raw speech samples $s^1(n)$ and $s^2(n)$ respectively. Again, in this embodiment, each of the speech sources 31 is modelled by an auto aggressive (AR) process. In other words, there will be a respective equation (1) for each of the sources 31-1 and 31-2, thereby defining two unknown AR filter coefficient vectors $\underline{a}^1$ and $\underline{a}^2$, each having a respective model order $k^1$ and $k^2$. These source models will also have a respective process noise component $e^1(n)$ and $e^2(n)$.

As shown in FIG. 11, the model also assumes that the speech generated by each of the sources 31 is received by both microphones 7. There is therefore a respective channel 33-11 to 33-22 between each source 31 and each microphone 7. There is also a respective measurement noise component $\epsilon^1(n)$ and $\epsilon^2(n)$ added to the signal received by each microphone. Again, in this embodiment, the statistical analysis unit 21 models each of the channels by a moving average (MA) filter. Therefore, the signal received from microphone 7-1 at time t=n is given by:

$$y^1(n)=h_{110}s^1(n)+h_{111}s^1(n-1)+h_{112}s^1(n-2)+\ldots+h_{11r_1}s^1(n-r_{11}) +h_{210}s^2(n)+h_{211}s^2(n-1)+h_{212}s^2(n-2)+\ldots+h_{21r_{21}}s^2(n-r_{21})+\epsilon^1(n) \quad (35)$$

where, for example, $h_{112}$ is the channel filter coefficient of the channel between the first source 31-1 and the microphone 7-1 at time t=2; and $r_{21}$ is the model order of the channel between the second speech source 31-2 and the microphone 7-1. A similar equation will exist to represent the signal received from the other microphone 7-2.

In this embodiment, the statistical analysis unit 21 aims to determine values for the AR filter coefficients for the two speech sources, which best represent the observed signal samples from the two microphones in the current frame being processed. It does this, by determining the AR filter coefficients for the two speakers ($\underline{a}^1$ and $\underline{a}^2$) that maximise the joint probability density function of the speech models, channel models, raw speech samples and the noise statistics given the observed signal samples output from the two analogue to digital converters 17-1 and 17-2, i.e. by determining:

$$\max_{\underline{a}^1,\underline{a}^2}\left\{\begin{array}{c} p\big(\underline{a}^1,\underline{a}^2,k^1,k^2,\underline{h}_{11},\underline{h}_{12},\underline{h}_{21},\underline{h}_{22},r_{11},r_{12},r_{21},r_{22}, \\ \sigma_{e_1}^2,\sigma_{e_2}^2,\sigma_{\varepsilon_1}^2,\sigma_{\varepsilon_2}^2,\underline{s}^1(n),\underline{s}^2(n)\mid\underline{y}^1(n),\underline{y}^2(n)\big)\end{array}\right\} \quad (36)$$

As those skilled in the art will appreciate, this is almost an identical problem to the single speaker single microphone system described above, although with more parameters. Again, to calculate this, the above probability is rearranged using Bayes law to give an equation similar to that given in equation (10) above. The only difference is that there will be many more joint probability density functions on the numerator. In particular, the joint probability density functions which will need to be considered in this embodiment are:

$p(\underline{y}^1(n)|\underline{s}^1(n),\underline{s}^2(n),\underline{h}_{11},\underline{h}_{21},r_{11},r_{21},\sigma_{\epsilon1}^2)$ $p(\underline{y}^2(n)|\underline{s}^1(n),\underline{s}^2(n),\underline{h}_{12},\underline{h}_{22},r_{12},r_{22},\sigma_{\epsilon2}^2)$ $p(\underline{s}^1(n)|\underline{a}^1,k^1,\sigma_{e1}^2)$, $p(\underline{s}^2(n)|\underline{a}^2,k^2,\sigma_{e2}^2)$ $p(\underline{a}^1|k^1,\sigma_{a1}^2,\underline{\mu}_{a1})$ $p(\underline{a}^2|k^2,\sigma_{a2}^2,\underline{\mu}_{a2})$ $p(\underline{h}_{11}|r_{11},\sigma_{h11}^2,\underline{\mu}_{h11})$ $p(\underline{h}_{12}|r_{12},\sigma_{h12}^2,\underline{\mu}_{h12})$ $p(\underline{h}_{21}|r_{21},\sigma_{h21}^2,\underline{\mu}_{h21})$ $p(\underline{h}_{22}|r_{22},\sigma_{h22}^2,\underline{\mu}_{h22})$ $P(\sigma_{a1}^2|\alpha_{a1},\beta_{a1})$ $P(\sigma_{a2}^2|\alpha_{a2},\beta_{a2})$ $p(\sigma_{e1}^2)$ $p(\sigma_{e2}^2)$ $P(\sigma_{h11}^2|\alpha_{h11},\beta_{h11})$ $P(\sigma_{h12}^2|\alpha_{h12},\beta_{h12})$ $P(\sigma_{h21}^2|\alpha_{h21},\beta_{h21})$ $P(\sigma_{h22}^2|\alpha_{h22},\beta_{h22})$ $p(k^1)$ $p(k^2)$ $p(r_{11})$ $p(r_{12})$ $p(r_{21})$ $p(r_{22})$ Since the speech sources and the channels are independent of each other, most of these components will be the same as the probability density functions given above for the single speaker single microphone system. This is not the case, however, for the joint probability density functions for the vectors of speech samples ($\underline{y}^1(n)$ and $\underline{y}^2(n)$) out from the analogue to digital converters 17, since these signals include components from both the speech sources. The joint probability density function for the speech samples output from analogue to digital converter 17-1 will now be described in more detail.

$p(\underline{y}^1(n)|\underline{s}^1(n),\underline{s}^2(n),\underline{h}_{11},\underline{h}_{21},r_{11},r_{21},\sigma_{\epsilon 1}^2)$ Considering all the speech samples output from the analogue to digital converter 17-1 in a current frame being processed (and with $h_{110}$ and $h_{210}$ being set equal to one), gives:

$$\underline{\varepsilon}^1(n) = \underline{q}^1(n) - [\,Y \;\vdots\; Y_2\,]\cdot\begin{bmatrix}\underline{h}_{11}\\ \cdots \\ \underline{h}_{21}\end{bmatrix} \tag{37}$$

where $$\underline{h}_{11} = \begin{bmatrix} h_{111}\\ h_{112}\\ h_{113}\\ \vdots \\ h_{11r_{11}}\end{bmatrix}_{r_{11}\times 1} \qquad \underline{h}_{21} = \begin{bmatrix} h_{211}\\ h_{212}\\ h_{213}\\ \vdots \\ h_{21r_{21}}\end{bmatrix}_{r_{21}\times 1}$$

$$\underline{q}^1(n) = \begin{bmatrix} q^1(n)\\ q^1(n-1)\\ q^1(n-2)\\ \vdots \\ q^1(n-N+1)\end{bmatrix}_{N\times 1} \qquad \underline{\varepsilon}^1(n) = \begin{bmatrix} \varepsilon^1(n)\\ \varepsilon^1(n-1)\\ \varepsilon^1(n-2)\\ \vdots \\ \varepsilon^1(n-N+1)\end{bmatrix}_{N\times 1}$$

and $$Y_1 = \begin{bmatrix} s^1(n-1) & s^1(n-2) & \cdots & s^1(n-r_{11})\\ s^1(n-2) & s^1(n-3) & \cdots & s^1(n-r_{11}-1)\\ s^1(n-3) & s^1(n-4) & \cdots & s^1(n-r_{11}-2)\\ \vdots & & \ddots & \\ s^1(n-N) & s^1(n-N-1) & \cdots & s^1(n-r_{11}-N+1)\end{bmatrix}_{N\times r_{11}}$$

$$Y_2 = \begin{bmatrix} s^2(n-1) & s^2(n-2) & \cdots & s^2(n-r_{21})\\ s^2(n-2) & s^2(n-3) & \cdots & s^2(n-r_{21}-1)\\ s^2(n-3) & s^2(n-4) & \cdots & s^2(n-r_{21}-2)\\ \vdots & & \ddots & \\ s^2(n-N) & s^2(n-N-1) & \cdots & s^2(n-r_{21}-N+1)\end{bmatrix}_{N\times r_{21}}$$

and $q^1(n)=y^1(n)-s^1(n)-s^2(n)$.

As in the single speaker single microphone system described above, the joint probability density function for the speech samples ($\underline{y}^1(n)$) output from the analogue to digital converter 17-1 is determined from the joint probability density function for the associated measurement noise ($\sigma_{\epsilon 1}^2$) using equation (14) above. Again, the Jacobean will be one and the resulting joint probability density function will have the following form:

$$p(\underline{y}^1(n)\,|\,\underline{s}^1(n),\underline{s}^2(n),\underline{h}_{11},\underline{h}_{21},r_{11},r_{21},\sigma_{\varepsilon_1}^2) = \tag{38}$$

$$(2\pi\sigma_{\varepsilon_1}^2)^{-\frac{N}{2}}\exp\left[\frac{-1}{2\sigma_{\varepsilon_1}^2}\left(\underline{q}^1(n)^T\underline{q}^1(n) - 2\underline{q}^1(n)[\,Y_1 \;\vdots\; Y_2\,]\cdot\begin{bmatrix}\underline{h}_{11}\\ \cdots\\ \underline{h}_{21}\end{bmatrix} + [\,\underline{h}_{11}^T \;\vdots\; \underline{h}_{21}^T\,]\cdot\begin{bmatrix} Y_1^TY_1 & Y_2^TY_1\\ Y_1^TY_2 & Y_2^TY_2\end{bmatrix}\begin{bmatrix}\underline{h}_{11}\\ \cdots\\ \underline{h}_{21}\end{bmatrix}\right)\right]$$

As those skilled in the art will appreciate, this is a

Gaussian distribution as before. In this embodiment, the statistical analysis unit 21 assumes that the raw speech data which passes through the two channels to the microphone 7-1 are independent of each other. This allows the above Gaussian distribution to be simplified since the cross components $Y_1^TY_2$ and $Y_2^TY_1$ can be assumed to be zero. This gives:

$$p(\underline{y}^1(n)\,|\,\underline{s}^1(n),\underline{s}^2(n),\underline{h}_{11},\underline{h}_{21},r_{11},r_{21},\sigma_{\varepsilon_1}^2) \propto \tag{39}$$

$$(2\pi\sigma_{\varepsilon_1}^2)^{-\frac{N}{2}}\exp\left[\frac{-1}{2\sigma_{\varepsilon_1}^2}(-2\underline{h}_{11}^TY_1^T\underline{q}^1(n) + \underline{h}_{11}^TY_1^TY_1\underline{h}_{11})\right] + \exp\left[\frac{-1}{2\sigma_{\varepsilon_1}^2}(-2\underline{h}_{21}^TY_2^T\underline{q}^1(n) + \underline{h}_{21}^TY_2^TY_2\underline{h}_{21})\right]$$

which is a product of two Gaussians, one for each of the two channels to the microphone 7-1. Note also that the initial term $\underline{q}^1(n)^T\,\underline{q}^1(n)$ has been ignored, since this is just a constant and will therefore only result in a corresponding scaling factor to the probability density function. This simplification is performed in this embodiment, since it is easier to draw a sample from each of the two Gaussians given in equation (39) individually rather than having to draw a single sample of both channels jointly from the larger Gaussian defined by equation (38).

The Gibbs sampler is then used to draw samples from the combined joint probability density function in the same way as for the single speaker-single microphone system, except that there are many more parameters and hence conditional densities to be sampled from. Again, the model order selector is used to adjust each of the model orders ($k^1$,$K^2$ and $r_{11}$-$r_{22}$) during the Gibbs iterations. As with the single source system described above, estimates of the raw speech samples from both the sources 31-1 and 31-2 are needed for the Gibbs sampling and again, these are estimated using the Simulation Smoother. The state space equations for the two speaker and two microphone system are slightly different to those of the single speaker single microphone system and are therefore reproduced below.

$$\underline{\hat{s}}^{\langle 1:2\rangle}(n) = \tilde{A}^{\langle 1:2\rangle}\cdot\underline{\hat{s}}^{\langle 1:2\rangle}(n-1) + B\cdot\underline{\hat{e}}^{\langle 1:2\rangle}(n) \tag{40}$$

$$\underline{y}^{\langle 1\ 2\rangle}(n) = H^{\langle 1:2\rangle}\cdot\underline{\hat{s}}^{\langle 1:2\rangle}(n-1) + D_\varepsilon\cdot\underline{\varepsilon}^{\langle 1:2\rangle}(n)$$

-continued where $$\tilde{A}^{\langle 1:2\rangle} = \begin{bmatrix} a_{11} & a_{12} & a_{13} & \cdots & a_1k^1 & \vdots & & & & & \\ 1 & 0 & 0 & \cdots & 0 & \vdots & & & & & \\ 0 & 1 & 0 & \cdots & 0 & \vdots & & & 0 & & \\ \vdots & & & \ddots & & \vdots & & & & & \\ & & & & 0 & \vdots & & & & & \\ \cdots & \cdots & \cdots & \cdots & \cdots & \cdots & \cdots & \cdots & \cdots & \cdots & \cdots \\ & & & & & \vdots & a_{21} & a_{22} & a_{23} & \cdots & a_2k^2 \\ & & & & & \vdots & 1 & 0 & 0 & \cdots & 0 \\ & & 0 & & & \vdots & 0 & 1 & 0 & \cdots & 0 \\ & & & & & \vdots & \vdots & & & & \\ & & & & & \vdots & & & & & 0 \end{bmatrix}_{m\times m}$$

$$\underline{\hat{s}}^{\langle 1\ 2\rangle}(n) = \begin{bmatrix} \hat{s}^1(n) \\ \hat{s}^1(n-1) \\ \hat{s}^1(n-2) \\ \vdots \\ \hat{s}^1(n-r_{11}+1) \\ \cdots \\ \hat{s}^2(n) \\ \hat{s}^2(n-1) \\ \hat{s}^2(n-2) \\ \vdots \\ \hat{s}^2(n-r_{21}+1) \end{bmatrix}_{m\times 1} \quad \underline{\hat{e}}^{\langle 1\ 2\rangle}(n) = \begin{bmatrix} \hat{e}_1(n) \\ 0 \\ 0 \\ \vdots \\ 0 \\ \cdots \\ \hat{e}_2(n) \\ 0 \\ 0 \\ \vdots \\ 0 \end{bmatrix}_{m\times 1}$$

$$B = \begin{bmatrix} \sigma_{e_1}^2 & 0 \\ 0 & 0 \\ \vdots & \vdots \\ 0 & 0 \\ \cdots & \cdots \\ 0 & \sigma_{e_2}^2 \\ 0 & 0 \\ \vdots & \vdots \\ 0 & 0 \end{bmatrix}_{m\times 2}$$

$$H^{\langle 1:2\rangle} = \begin{bmatrix} h_{111} & h_{112} & h_{113} & \cdots & h_{11r_{11}} & \vdots & h_{211} & h_{212} & h_{213} & \cdots & h_{21r_{21}} \\ \cdots & \cdots & \cdots & \cdots & \cdots & \vdots & \cdots & \cdots & \cdots & \cdots & \cdots \\ h_{121} & h_{122} & h_{123} & \cdots & h_{12r_{12}} & \vdots & h_{221} & h_{222} & h_{223} & \cdots & h_{22r_{22}} \end{bmatrix}_{2\times m}^T$$

and $$\underline{y}^{\langle 1\ 2\rangle}(n) = \begin{bmatrix} y^1(n) \\ \cdots \\ y^2(n) \end{bmatrix} \quad D = \begin{bmatrix} \sigma_{\varepsilon_1}^2 & 0 \\ 0 & \sigma_{\varepsilon_2}^2 \end{bmatrix} \quad \underline{\varepsilon}^{\langle 1\ 2\rangle}(n) = \begin{bmatrix} \varepsilon^1(n) \\ \cdots \\ \varepsilon^2(n) \end{bmatrix}$$

where m is the larger of the AR filter model orders and the MA filter model orders. Again, this results in slightly more complicated Kalman filter equations and smoothing filter equations and these are given below for completeness.

Kalman Filter Equations $$\underline{w}(t)=\underline{y}^{<1:2>}(t)-H^{<1:2>^T}\hat{\underline{s}}^{<1:2>}(t)$$

$$D(t)=H^{<1:2>^T}P(t)H^{<1:2>}+D_\epsilon \cdot D_\epsilon^T$$

$$K_f(t)=(\tilde{A}^{<1:2>}P(t)H^{<1:2>})\cdot D(t)^{-1}$$

$$\hat{\underline{s}}^{<1:2>}(t+1)=\tilde{A}^{<1:2>}\hat{\underline{s}}^{<1:2>}(t)+K_f(t)\cdot \underline{w}(t)$$

$$L(t)=\tilde{A}^{<1:2>}-K_f(t)\cdot H^{<1:2>^T}$$

$$P(t+1)=\tilde{A}^{<1:2>}P(t)L(t)^T+D_\epsilon \cdot D_\epsilon^T \tag{41}$$

Smoothing Filter Equations $$C(t)=B\cdot B^T-B\cdot B^T\cdot U(t)B\cdot B^T$$

$$\underline{\eta}(t)\sim N(0,C(t))$$

$$V(t)=B\cdot B^T U(t)L(t)$$

$$\underline{r}(t-1)=H^{<1\ 2>}D(t)^{-1}\underline{w}(t)+L(t)^T\underline{r}(t)-V(t)^TC(t)^{-1}\underline{\eta}(t)$$

$$U(t-1)=H^{<1:2>}D(t)^{-1}H^{<1:2>^T}+L(t)^TU(t)L(t)+V(t)^TC(t)^{-1}V(t)$$

$$\underline{\tilde{e}}^{<1:2>}(t)=B\cdot B^T\underline{r}(t)+\underline{\eta}(t)$$

where $\underline{\tilde{e}}^{<1:2>}(t)=[\tilde{e}_1(t)\tilde{e}_1(t-1)\ \ldots\ \tilde{e}_1(t-r+1):\tilde{e}_2(t)\tilde{e}_2(t-1)\ \ldots\ \tilde{e}_2(t-r+1)]^T$ $$\hat{\underline{s}}^{<1:2>}(t)=\tilde{A}^{<1.2>}\hat{\underline{s}}^{<1:2>}(t-1)+\hat{\underline{e}}^{<1:2>}(t)$$

where $\hat{\underline{e}}^{<1:2>}(t)=[\hat{e}^{<1:2>}(t)\ 0\ \ldots\ 0\ :\hat{\underline{e}}^{<1:2>}(t)=[\hat{e}^{<1:2>}(t)0\ \ldots\ 0\ ]^T$ (42)

The processing steps performed by the statistical analysis unit 21 for this two speaker two microphone system are the same as those used in the single speaker single microphone system described above with reference to FIGS. 8 and 9 and will not, therefore, be described again.

Figure 12:
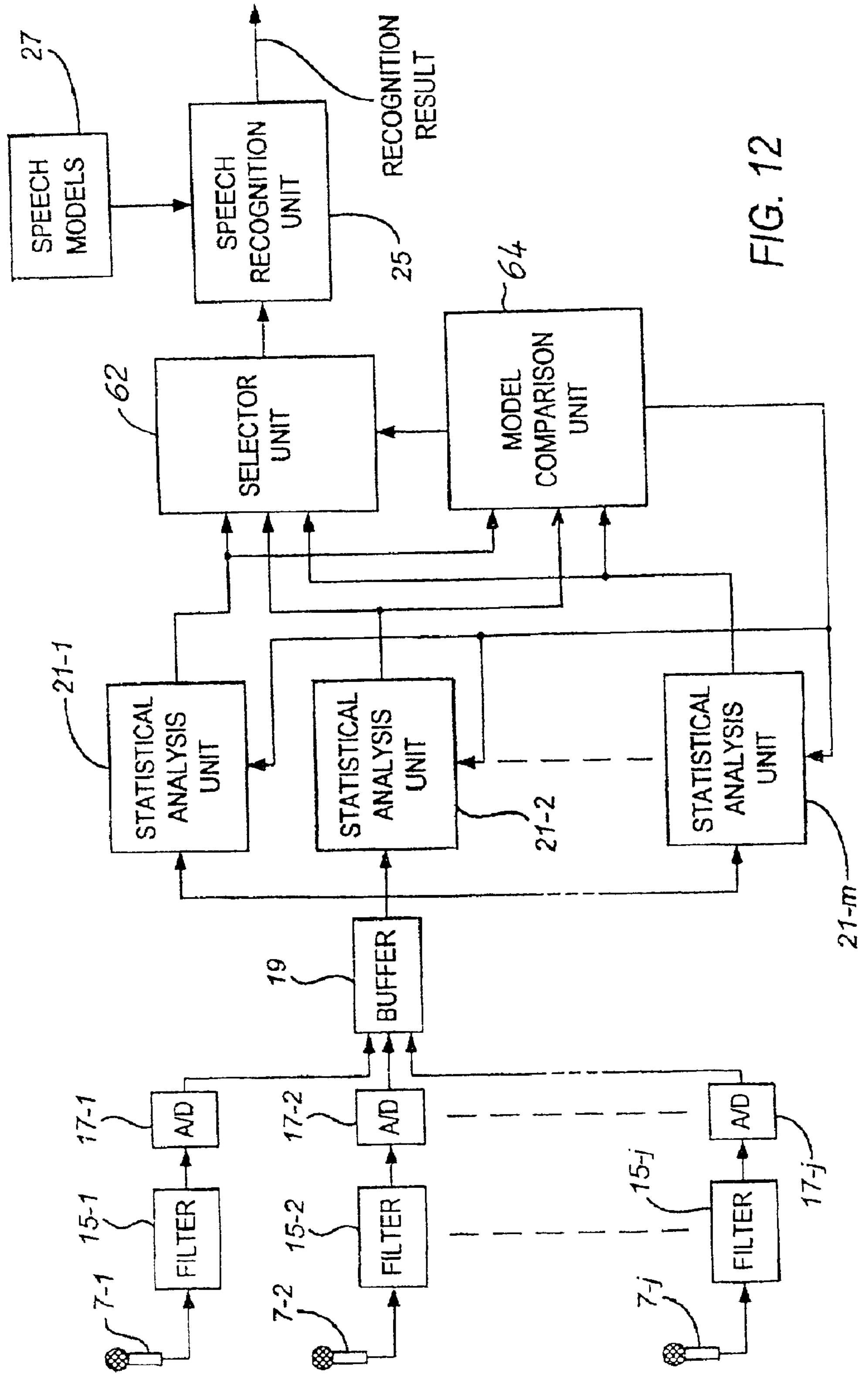
FIG. 12 is block diagram illustrating the principal components of a speech recognition system embodying the present invention.

In the above two speaker two microphone system, the system assumed that there were two speakers. In a general system, the number of speakers at any given time will be unknown. FIG. 12 is a block diagram illustrating a multi-speaker multi-microphone speech recognition system. As shown in FIG. 12, the system comprises a plurality of microphones 7-1 to 7-j, each of which receives speech signals from an unknown number of speech sources (not shown). The corresponding electrical signals output by the microphones 7 are then passed through a respective filter 15 and then digitized by a respective analogue to digital converter 17. The digitized speech signals from each of the microphones 7 are then stored in the buffer 19 as before. As shown in FIG. 12, the speech stored within the buffer 19 is fed into a plurality (m) of statistical analysis units 21. Each of the statistical analysis units is programmed to apply the current frame of speech samples to the following probability density function and to then draw samples from it in the manner described above:

$$\prod_{j=1}^{N_{SEN}}\left[\left(2\pi\sigma_{\varepsilon_j}^2\right)^{-\frac{N}{2}}\exp\left[\frac{-1}{2\sigma_{\varepsilon_j}^2}\left(-2\underline{h}_{\langle 1\cdot Z,j\rangle}^T Y_{\langle 1:Z\rangle}^T\underline{y}^j(n)+\right.\right.\right. \tag{43}$$

$$\left.\left.\left.\underline{h}_{\langle 1:Z,j\rangle}^T Y_{\langle 1:Z\rangle}^T Y_{\langle 1:Z\rangle} h_{\langle 1:Z,j\rangle}\right)\right]\right]\times\prod_{i=1}^{Z}\left[(2\pi\sigma_{e_i}^2)^{-\frac{N}{2}}\exp\right.$$

-continued $$\left[\frac{-1}{2\sigma_{e_i}^2}\left(\underline{s}^i(n)^T\underline{s}^i(n) - 2\underline{a}^{i^T}S^i\underline{s}^i(n) + \underline{a}^{i^T}S^{i^T}S^i\underline{a}^i\right)\right]\Bigg] \times$$

$$\prod_{i=1}^{Z}\left[(2\pi\sigma_{a_i}^2)^{-\frac{N}{2}}\exp\left[\frac{-\left(\underline{a}^i - \underline{\mu}_{a_i}\right)^T\left(\underline{a}^i - \underline{\mu}_{a_i}\right)}{2\sigma_{a_i}^2}\right]\right] \times$$

$$\prod_{j=1}^{N_{SEN}}\left[\prod_{i=1}^{Z}\left[\left(2\pi\sigma_{h_{ij}}^2\right)^{-\frac{N}{2}}\exp\left[\frac{-\left(\underline{h}_{ij} - \underline{\mu}_{h_{ij}}\right)^T\left(\underline{h}_{ij} - \underline{\mu}_{h_{ij}}\right)}{2\sigma_{h_{ij}}^2}\right]\right]\right] \times$$

$$\prod_{i=1}^{Z}\left[\frac{(\sigma_{a_i}^2)^{-(\alpha_{a_i}+1)}}{\beta_{a_i}\Gamma(\alpha_{a_i})}\exp\left[\frac{-1}{\sigma_{a_i}^2\beta_{a_i}}\right]\right] \times$$

$$\prod_{j=1}^{N_{SEN}}\left[\prod_{i=1}^{Z}\left[\frac{\left(\sigma_{h_{ij}}^2\right)^{-\left(\alpha_{h_{ij}}+1\right)}}{\beta_{h_{ij}}\Gamma\left(\alpha_{h_{ij}}\right)}\exp\left[\frac{-1}{\sigma_{h_{ij}}^2\beta_{h_{ij}}}\right]\right]\right] \times$$

$$\prod_{i=1}^{Z}\left[\frac{(\sigma_{e_i}^2)^{-(\alpha_{e_i}+1)}}{\beta_{e_i}\Gamma(\alpha_{e_i})}\exp\left[\frac{-1}{\sigma_{e_i}^2\beta_{e_i}}\right]\right] \times \prod_{j=1}^{N_{SEN}}\left[\frac{\left(\sigma_{\varepsilon_j}^2\right)^{-\left(\alpha_{\varepsilon_j}+1\right)}}{\beta_{\varepsilon_j}\Gamma\left(\alpha_{\varepsilon_j}\right)}\exp\left[\frac{-1}{\sigma_{\varepsilon_j}^2\beta_{\varepsilon_j}}\right]\right]$$

where $N_{SEN}$ is the number of microphones 7 and Z is the number of speakers (which is different for each of the analysis units 21 and is set by a model comparison unit 64). In this way, each of the analysis units 21 performs a similar analysis using the same input data (the speech samples from the microphones) but assumes that the input data was generated by a different number of speakers. For example, statistical analysis unit 21-1 may be programmed to assume that there are three speakers currently speaking whereas statistical analysis unit 21-2 may be programmed to assume that there are five speakers currently speaking etc.

During the processing of each frame of speech by the statistical analysis units 21, some of the parameter samples drawn by the Gibbs sampler are supplied to the model comparison unit 64 so that it can identify the analysis unit that models best the speech in the current frame being processed. In this embodiment samples from every fifth Gibbs iteration are output to the model comparison unit 64 for this determination to be made. After each of the analysis units has finished sampling the above probability density function, it determines the mean AR filter coefficients for the programmed number of speakers in the manner described above and outputs these to a selector unit 62. At the same time, after the model comparison unit 64 has determined the best analysis unit, it passes a control signal to the selector unit 62 which causes the AR filter coefficients output by this analysis unit 21 to be passed to the speech recognition unit 25 for comparison with the speech models 27. In this embodiment, the model comparison unit 64 is also arranged to reprogram each of the statistical analysis units 21 after the processing of each frame has been completed, so that the number of speakers that each of the analysis units is programmed to model is continuously adapted. In this way, the system can be used in, for example, a meeting where the number of participants speaking at any one time may vary considerably.

Figure 13:
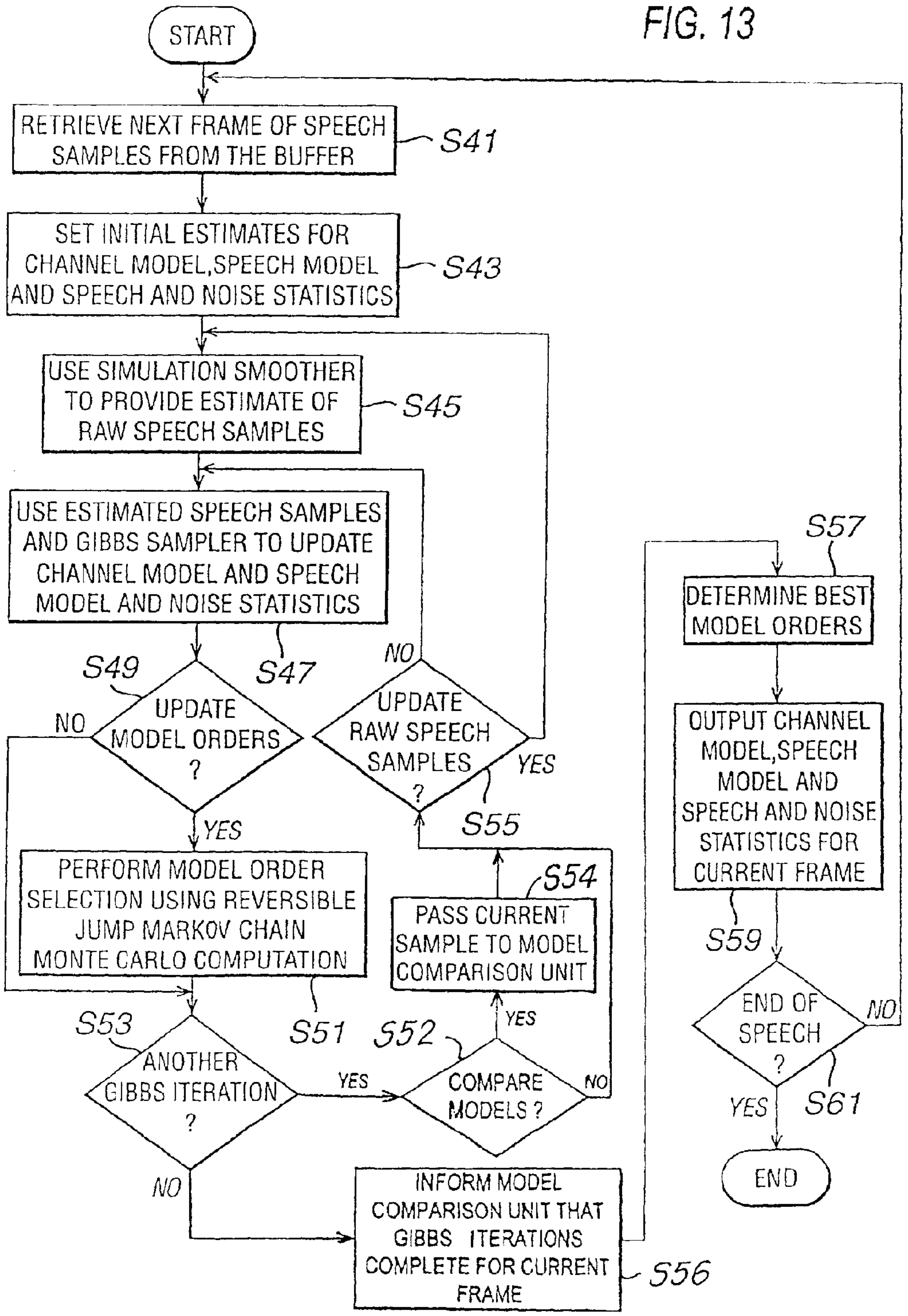
FIG. 13 is a flow chart illustrating the main processing steps performed by the statistical analysis units used in the speech recognition system shown in FIG. 12.

FIG. 13 is a flow diagram illustrating the processing steps performed in this embodiment, by each of the statistical analysis units 21. As can be seen from a comparison of FIG. 13 with FIG. 8, the processing steps employed are substantially the same as in the above embodiment, except for the additional steps S52, S54 and S56. A description of these steps will now be given. As shown in FIG. 13, if step s54 determines that another Gibbs iteration is to be run, then the processing proceeds to step S52 where each of the statistical analysis units 21-1 determines whether or not to send the parameter samples from the last Gibbs iteration to the model comparison unit 64. As mentioned above, the model comparison unit 64 compares the samples generated by the analysis units every fifth Gibbs iteration. Therefore, if the samples are to be compared, then the processing proceeds to step S54 where each of the statistical analysis units 21-1 sends the current set of parameter samples to the model comparison unit 64. The processing then proceeds to step S55 as before. Once the analysis units 21 have completed the sampling operation for the current frame, the processing then proceeds to step S56 where each of the statistical analysis units 21-1 informs the model comparison unit 64 that it has completed the Gibbs iterations for the current frame before proceeding to step s57 as before.

Figure 14:
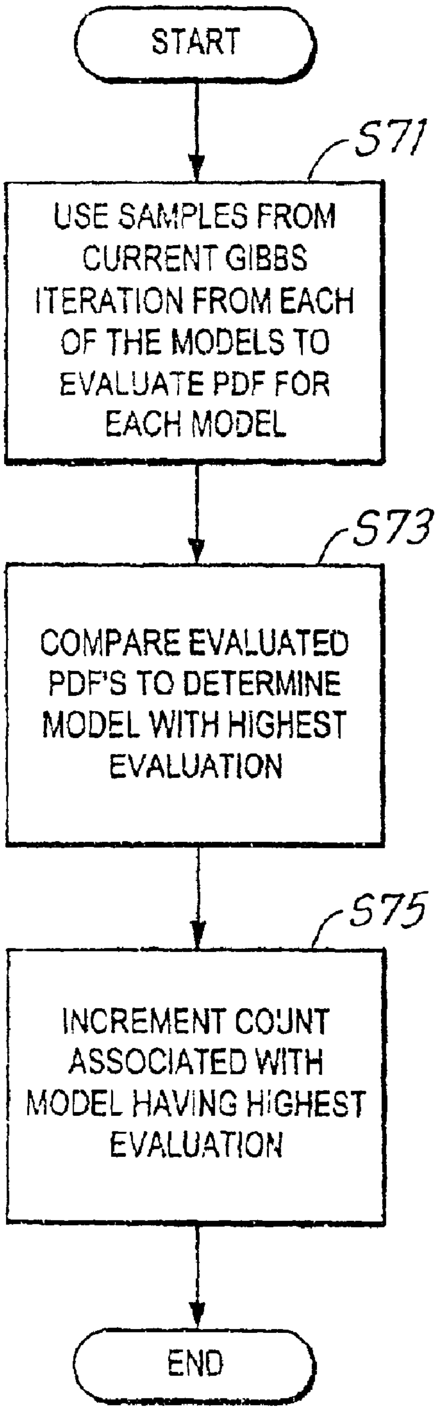
FIG. 14 is a flow chart illustrating the processing steps performed by a model comparison unit forming part of the system shown in FIG. 12 during the processing of a frame of speech by the statistical analysis units shown in FIG. 12.

The processing steps performed by the model comparison unit 64 in this embodiment will now be described with reference to FIGS. 14 and 15. As shown, FIG. 14 is a flow chart and illustrates the processing steps performed by the model comparison unit 64 when it receives the samples from each of the statistical analysis units 21 during the Gibbs iterations. As shown, in step S71, the model comparison unit 64 uses the samples received from each of the statistical analysis units 21 to evaluate the probability density function given in equation (43). The processing then proceeds to step S73 where the model comparison unit 64 compares the evaluated probability density functions to determine which statistical analysis unit gives the highest evaluation. The processing then proceeds to step S75 where the model comparison unit 64 increments a count associated with the statistical analysis unit 21 having the highest evaluation. The processing then ends.

Figure 15:
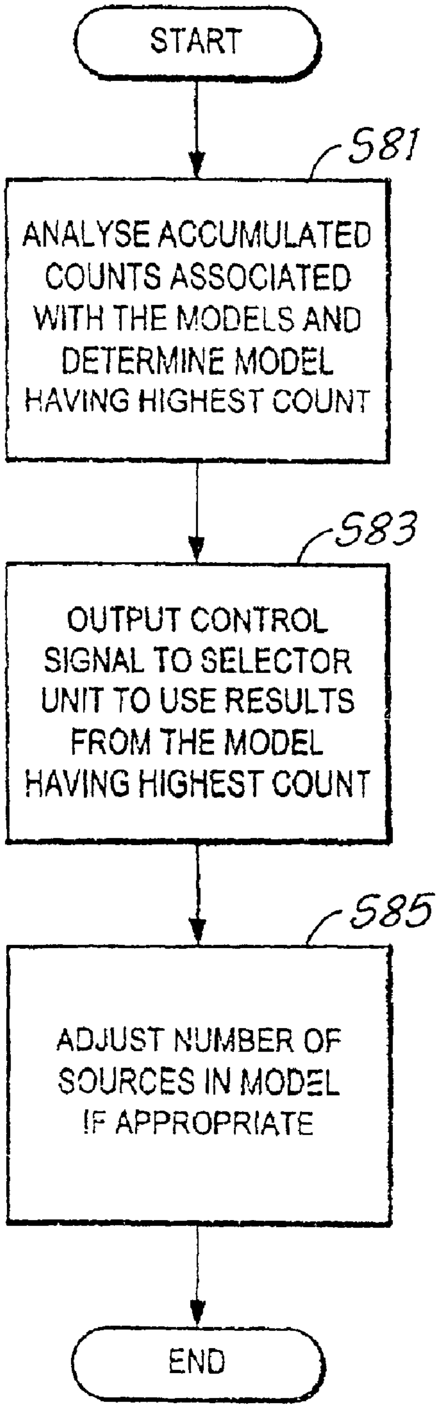
FIG. 15 is a flow chart illustrating the processing steps performed by the model comparison unit shown in FIG. 12 after a sampling routine performed by the statistical analysis unit shown in FIG. 12 has been completed.

Once all the statistical analysis units 21 have carried out all the Gibbs iterations for the current frame of speech being processed, the model comparison unit performs the processing steps shown in FIG. 15. In particular, at step S81, the model comparison unit 64 analyses the accumulated counts associated with each of the statistical analysis units, to determine the analysis unit having the highest count. The processing then proceeds to step S83 where the model comparison unit 64 outputs a control signal to the selector unit 62 in order to cause the AR filter coefficients generated by the statistical analysis unit having the highest count to be passed through the selector 62 to the speech recognition unit 25. The processing then proceeds to step S85 where the model comparison unit 64 determines whether or not it needs to adjust the settings of each of the statistical analysis units 21, and in particular to adjust the number of speakers that each of the statistical analysis units assumes to be present within the speech.

As those skilled in the art will appreciate, a multi speaker multi microphone speech recognition has been described above. This system has all the advantages described above for the single speaker single microphone system. It also has the further advantages that it can simultaneously separate and model the speech from a number of sources. Further, there is no limitation on the physical separation of the sources relative to each other or relative to the microphones. Additionally, the system does not need to know the physical separation between the microphones and it is possible to separate the signals from each source even where the number of microphones is fewer than the number of sources.

Alternative Embodiments

Figure 16:
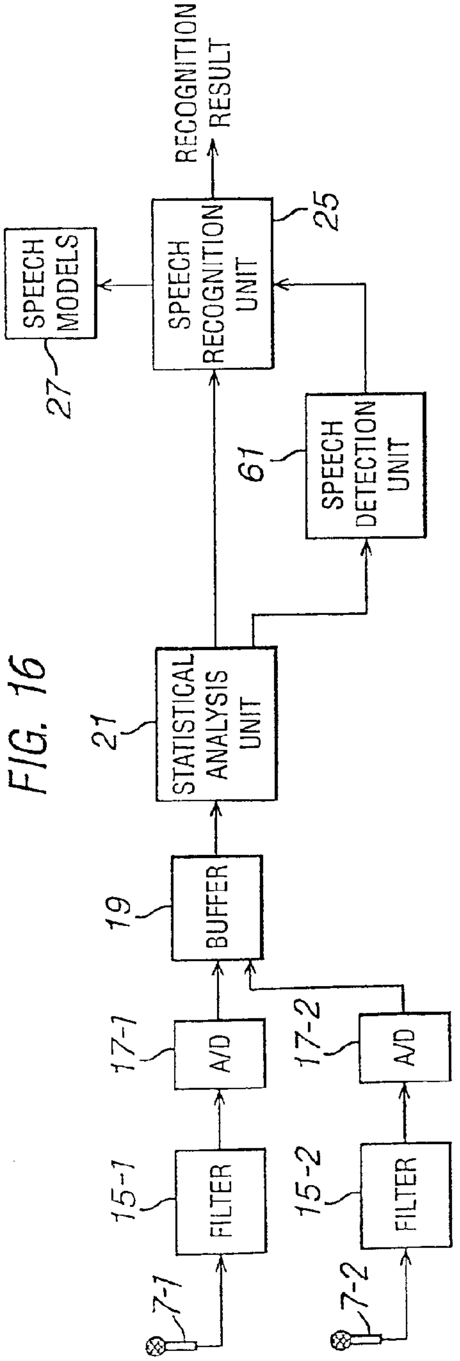
FIG. 16 is a block diagram illustrating the main components of an alternative speech recognition system in which data output by the statistical analysis unit is used to detect the beginning and end of speech within the input signal.

In the above embodiment, the statistical analysis unit was used as a pre-processor for a speech recognition system in order to generate AR coefficients representative of the input speech. It also generated a number of other parameter values (such as the process noise variances and the channel model coefficients), but these were not output by the statistical analysis unit. As those skilled in the art will appreciate, the AR coefficients and some of the other parameters which are calculated by the statistical analysis unit can be used for other purposes. For example, FIG. 16 illustrates a speech recognition system which is similar to the speech recognition system shown in FIG. 10 except that there is no coefficient converter since the speech recognition unit 25 and speech models 27 are AR coefficient based. The speech recognition system shown in FIG. 16 also has an additional speech detection unit 61 which receives the AR filter coefficients (a) together with the AR filter model order (k) generated by the statistical analysis unit 21 and which is operable to determine from them when speech is present within the signals received from the microphones 7. It can do this, since the AR filter model orders and the AR filter coefficient values will be larger during speech than when there is no speech present. Therefore, by comparing the AR filter model order (k) and/or the AR filter coefficient values with appropriate threshold values, the speech detection unit 61 can determine whether or not speech is present within the input signal. When the speech detection unit 61 detects the presence of speech, it outputs an appropriate control signal to the speech recognition unit 25 which causes it to start processing the AR coefficients it receives from the statistical analysis unit 21. Similarly, when the speech detection unit 61 detects the end of speech, it outputs an appropriate control signal to the speech recognition unit 25 which causes it to stop processing the AR coefficients it receives from the statistical analysis unit 21.

Figure 17:
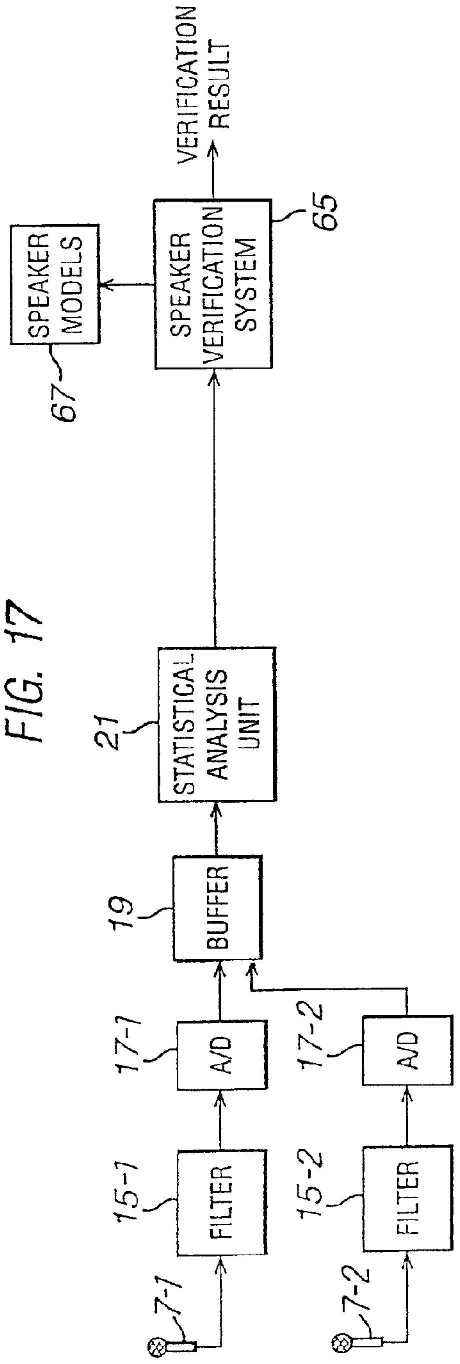
FIG. 17 is a schematic block diagram illustrating the principal components of a speaker verification system.

In the above embodiments, a speech recognition system was described having a particular speech pre-processing front end which performed a statistical analysis of the input speech. As the those skilled in the art will appreciate, this pre-processing can be used in speech processing systems other than speech recognition systems. For example, as shown in FIG. 17, the statistical analysis unit 21 may form a front end to a speaker verification system 65. In this embodiment, the speaker verification system 65 compares the sequences of AR filter coefficients for the different speakers output by the statistical analysis unit 21 with pre-stored speaker models 67 to determine whether or not the received speech corresponds to known users.

Figure 18:
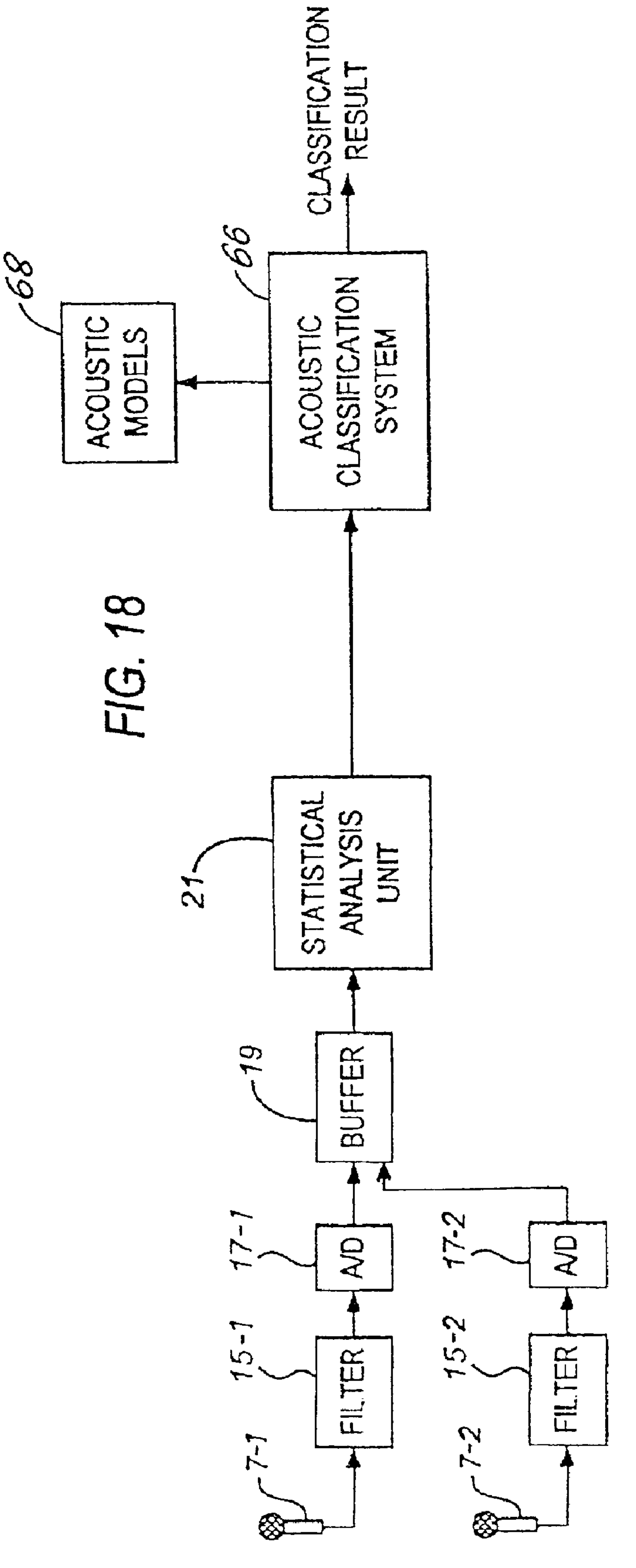
FIG. 18 is a schematic block diagram illustrating the principal components of an acoustic classification system.

FIG. 18 illustrates another application for the statistical analysis unit 21. In particular, FIG. 18 shows an acoustic classification system. The statistical analysis unit 21 is used to generate the AR filter coefficients for each of a number of acoustic sources (which may or may not be speech) in the manner described above. The coefficients are then passed to an acoustic classification system 66 which compares the AR coefficients of each source with pre-stored acoustic models 68 to generate a classification result. Such a system may be used, for example, to distinguish and identify, for example, percussion sounds, woodwind sounds, brass sounds as well as speech.

Figure 19:
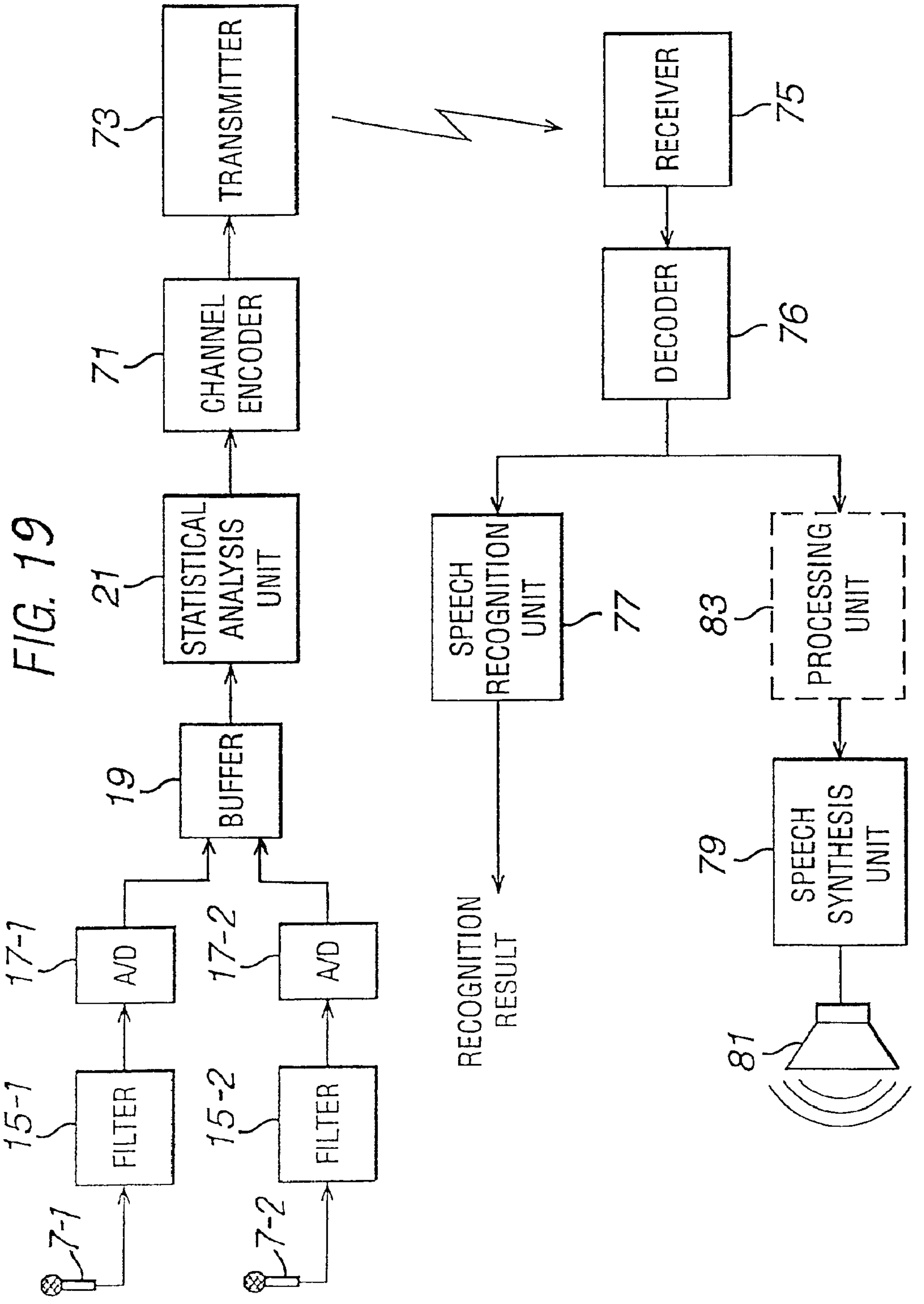
FIG. 19 is a schematic block diagram illustrating the principal components of a speech encoding and transmission.

FIG. 19 illustrates another application for the statistical analysis unit 21. In particular, FIG. 19 shows a speech encoding and transmission system. The statistical analysis unit 21 is used to generate the AR filter coefficients for each speaker in the manner described above. These coefficients are then passed to a channel encoder which encodes the sequences of AR filter coefficients so that they are in a more suitable form for transmission through a communications channel. The encoded AR filter coefficients are then passed to a transmitter 73 where the encoded data is used to modulate a carrier signal which is then transmitted to a remote receiver 75. The receiver 75 demodulates the received signal to recover the encoded data which is then decoded by a decoder 76. The sequences of AR filter coefficients output by the decoder are then either passed to a speech recognition unit 77 which compares the sequences of AR filter coefficients with stored reference models (not shown) to generate a recognition result or to a speech synthesis unit 79 which re-generates the speech and outputs it via a loudspeaker 81. As shown, prior to application to the speech synthesis unit 79, the sequences of AR filter coefficients may also pass through an optional processing unit 83 (shown in phantom) which can be used to manipulate the characteristics of the speech that is synthesised. One of the significant advantages of using the statistical analysis unit described above is that the model orders for the AR filter models are not assumed to be constant and will vary from frame to frame. In this way, the optimum number of AR filter coefficients will be used to represent the speech from each speaker within each frame. In contrast, with linear prediction analysis, the number of AR filter coefficients is assumed to be constant and hence the prior art techniques tend to over parameterise the speech in order to ensure that information is not lost. As a result, with the statistical analysis described above, the amount of data which has to be transmitted from the transmitter to the receiver will be less than with the prior art systems which assume a fixed size of AR filter model.

Figure 20:
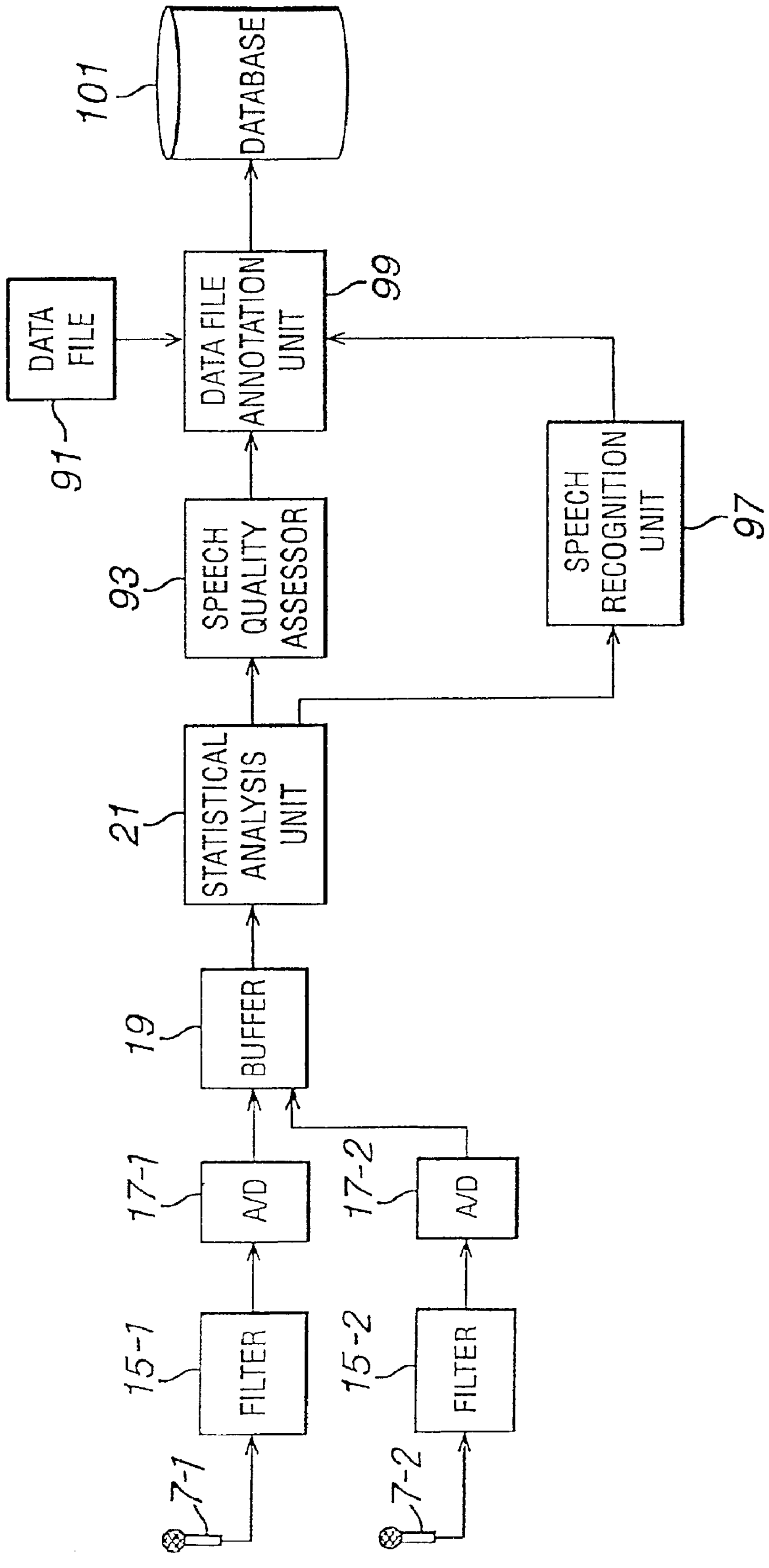
FIG. 20 is a block diagram illustrating the principal components of a data file annotation system which uses the statistical analysis unit shown in FIG. 6 to provide quality of speech data for an associated annotation.

FIG. 20 shows another system which uses the statistical analysis unit 21 described above. The system shown in FIG. 20 automatically generates voice annotation data for adding to a data file. The system may be used, for example, to generate voice annotation data for a meeting involving a number of participants, with the data file 91 being a recorded audio file of the meeting. In use, as the meeting progresses, the speech signals received from the microphones is processed by the statistical analysis unit 21 to separate the speech signals from each of the participants. Each participant's speech is then tagged with an identifier identifying who is speaking and then passed to a speech recognition unit 97, which generates words and/or phoneme data for each speaker. This word and/or phoneme data is then passed to a data file annotation unit 99, which annotates the data file 91 with the word and/or phoneme data and then stores the annotated data file in a database 101. In this way, subsequent to the meeting, a user can search the data file 91 for a particular topic that was discussed at the meeting by a particular participant.

In addition, in this embodiment, the statistical analysis unit 21 also outputs the variance of the AR filter coefficients for each of the speakers. This variance information is passed to a speech quality assessor 93 which determines from this variance data, a measure of the quality of each participant's speech. As those skilled in the art will appreciate, in general, when the input speech is of a high quality (i.e. not disturbed by high levels of background noise), this variance should be small and where there are high levels of noise, this variance should be large. The speech quality assessor 93 then outputs this quality indicator to the data file annotation unit 99 which annotates the data file 91 with this speech quality information.

As the those skilled in the art will appreciate, these speech quality indicators which are stored with the data file are useful for subsequent retrieval operations. In particular, when the user wishes to retrieve a data file 91 from the database 101 (using a voice query), it is useful to know the quality of the speech that was used to annotate the data file and/or the quality of the voice retrieval query used to retrieve the data file, since this will affect the retrieval performance. In particular if the voice annotation is of a high quality and the user's retrieval query is also of a high quality, then a stringent search of the database 101 can be performed, in order to reduce the amount of false identifications. In contrast, if the original voice annotation is of a low quality or if the user's retrieval query is of a low quality, then a less stringent search of the database 101 can be performed to give a higher chance of retrieving the correct data file 91.

In addition to using the variance of the AR filter coefficients as an indication of the speech quality, the variance ($\sigma_e^2$) of the process noise is also a good measure of the quality of the input speech, since this variance is also measure of the energy in the process noise. Therefore, the variance of the process noise can be used in addition to or instead of the variance of the AR filter coefficients to provide the measure of quality of the input speech.

In the embodiment described above with reference to FIG. 16, the statistical analysis unit 21 may be used solely for providing information to the speech detection unit 61 and a separate speech preprocessor may be used to parameterise the input speech for use by the speech recognition unit 25. However, such separate parameterisation of the input speech is not preferred because of the additional processing overhead involved.

The above embodiments have described a statistical analysis technique for processing signals received from a number of microphones in response to speech signals generated by a plurality of speakers. As those skilled in the art will appreciate, the statistical analysis technique described above may be employed in fields other than speech and/or audio processing. For example, the system may be used in fields such as data communications, sonar systems, radar systems etc.

In the first embodiment described above, the AR filter coefficients output by the statistical analysis unit 21 were converted into cepstral coefficients since the speech recognition unit used in the first embodiment was a cepstral based system. As those skilled in the art will appreciate, if the speech recognition system is designed to work with other spectral coefficients, then the coefficient converter 23 may be arranged to convert the AR filter coefficients into the appropriate spectral parameters. Alternatively still, if the speech recognition system is designed to operate with AR coefficients, then the coefficient converter 23 is unnecessary.

In the above embodiments, Gaussian and Inverse Gamma distributions were used to model the various prior probability density functions of equation (19). As those skilled in the art of statistical analysis will appreciate, the reason these distributions were chosen is that they are conjugate to one another. This means that each of the conditional probability density functions which are used in the Gibbs sampler will also either be Gaussian or Inverse Gamma. This therefore simplifies the task of drawing samples from the conditional probability densities. However, this is not essential. The noise probability density functions could be modelled by Laplacian or student-t distributions rather than Gaussian distributions. Similarly, the probability density functions for the variances may be modelled by a distribution other than the Inverse Gamma distribution. For example, they can be modelled by a Rayleigh distribution or some other distribution which is always positive. However, the use of probability density functions that are not conjugate will result in increased complexity in drawing samples from the conditional densities by the Gibbs sampler.

Additionally, whilst the Gibbs sampler was used to draw samples from the probability density function given in equation (19), other sampling algorithms could be used. For example the Metropolis-Hastings algorithm (which is reviewed together with other techniques in a paper entitled "Probabilistic inference using Markov chain Monte Carlo methods" by R. Neal, Technical Report CRG-TR-93-1, Department of Computer Science, University of Toronto, 1993) may be used to sample this probability density.

In the above embodiment, a Simulation Smoother was used to generate estimates for the raw speech samples. This Simulation Smoother included a Kalman filter stage and a smoothing filter stage in order to generate the estimates of the raw speech samples. In an alternative embodiment, the smoothing filter stage may be omitted, since the Kalman filter stage generates estimates of the raw speech (see equation (33)). However, these raw speech samples were ignored, since the speech samples generated by the smoothing filter are considered to be more accurate and robust. This is because the Kalman filter essentially generates a point estimate of the speech samples from the joint probability density function for the raw speech, whereas the Simulation Smoother draws a sample from this probability density function.

In the above embodiment, a Simulation Smoother was used in order to generate estimates of the raw speech samples. It is possible to avoid having to estimate the raw speech samples by treating them as "nuisance parameters" and integrating them out of equation (19). However, this is not preferred, since the resulting integral will have a much more complex form than the Gaussian and Inverse Gamma mixture defined in equation (19). This in turn will result in more complex conditional probabilities corresponding to equations (20) to (30). In a similar way, the other nuisance parameters (such as the coefficient variances or any of the Inverse Gamma, alpha and beta parameters) may be integrated out as well. However, again this is not preferred, since it increases the complexity of the density function to be sampled using the Gibbs sampler. The technique of integrating out nuisance parameters is well known in the field of statistical analysis and will not be described further here.

In the above embodiment, the data analysis unit analysed the samples drawn by the Gibbs sampler by determining a histogram for each of the model parameters and then determining the value of the model parameter using a weighted average of the samples drawn by the Gibbs sampler with the weighting being dependent upon the number of samples in the corresponding bin. In an alterative embodiment, the value of the model parameter may be determined from the histogram as being the value of the model parameter having the highest count. Alternatively, a predetermined curve (such as a bell curve) could be fitted to the histogram in order to identify the maximum which best fits the histogram.

In the above embodiment, the statistical analysis unit modelled the underlying speech production process with separate speech source models (AR filters) and channel models. Whilst this is the preferred model structure, the underlying speech production process may be modelled without the channel models. In this case, there is no need to estimate the values of the raw speech samples using a Kalman filter or the like, although this can still be done. However, such a model of the underlying speech production process is not preferred, since the speech model will inevitably represent aspects of the channel as well as the speech. Further, although the statistical analysis unit described above ran a model order selection routine in order to allow the model orders of the AR filter model and the channel model to vary, this is not essential. In particular, the model order of the AR filter model and the channel model may be fixed in advance, although this is not preferred since it will inevitably introduce errors into the representation.

In the above embodiments, the speech that was processed was received from a user via a microphone. As those skilled in the art will appreciate, the speech may be received from a telephone line or may have been stored on a recording medium. In this case, the channel models will compensate for this so that the AR filter coefficients representative of the actual speech that has been spoken should not be significantly affected.

In the above embodiments, the speech generation process was modelled as an auto-regressive (AR) process and the channel was modelled as a moving average (MA) process. As those skilled in the art will appreciate, other signal models may be used. However, these models are preferred because it has been found that they suitably represent the speech source and the channel they are intended to model.

In the above embodiments, during the running of the model order selection routine, a new model order was proposed by drawing a random variable from a predetermined Laplacian distribution function. As those skilled in the art will appreciate, other techniques may be used. For example the new model order may be proposed in a deterministic way (ie under predetermined rules), provided that the model order space is sufficiently sampled.

What is claimed is:

1. An acoustic signal processing computer apparatus comprising:

one or more receivers for receiving a set of signal values representative of a combination of a plurality of acoustic signals generated by a plurality of acoustic signal sources;

a memory for storing a predetermined function which gives, for a given set of received signal values, a probability density for parameters of a respective signal model, each of which is assumed to have generated a respective one of the acoustic signals represented by the received signal values;

an applicator operable to apply the set of received signal values to said stored function to generate said probability density function;

a processor operable to process said probability density function to derive samples of parameter values from said probability density function; and an analyser operable to analyse at least some of said derived samples of parameter values to determine, for at least one of said sources, parameter values that are representative of the acoustic signals generated by said at least one of said sources.

2. An apparatus according to claim 1, wherein said processor is operable to draw samples of parameter values from said probability density function and wherein said analyser is operable to analyse said drawn samples to determine said parameter values that are representative of the acoustic signals generated by said at least one of said sources.

3. An apparatus according to claim 2, wherein said processor is operable to draw samples iteratively from said probability density function.

4. An apparatus according to claim 2, wherein said processor comprises a Gibbs sampler.

5. An apparatus according to claim 1, wherein said analyser is operable to determine a histogram of said derived samples and wherein said parameter values are determined from said histogram.

6. An apparatus according to claim 5, wherein said analyser is operable to determine said parameter values using a weighted sum of said derived samples, and wherein the weighting for each sample is determined from said histogram.

7. An apparatus according to claim 1, wherein said one or more receivers is operable to receive a sequence of sets of signal values representative of acoustic signals generated by said plurality of signal sources and wherein said applicator, processor and analyser are operable to perform their function with respect to each set of received signal values in order to determine parameter values that are representative of the acoustic signals generated by said at least one of said sources.

8. An apparatus according to claim 7, wherein said processor is operable to use the parameter values obtained during the processing of a preceding set of signal values as initial estimates for the parameter values of a current set of signal values being processed.

9. An apparatus according to claim 7, wherein said sets of signal values in said sequence are non-overlapping.

10. An apparatus according to claim 1, wherein said signal model comprises an auto-regressive process model and wherein said parameters include auto-regressive model coefficients.

11. An apparatus according to claim 1, wherein said analyser is operable to analyse at least some of said derived samples of parameter values to determine a measure of the variance of said samples and wherein the apparatus further comprises an outputter operable to output a signal indicative of the quality of said received set of signal values in dependence upon said determined variance measure.

12. An apparatus according to claim 11, wherein said probability density function is in terms of said variance measure, wherein said processor is operable to draw samples of said variance measure from said probability density function and wherein said analyser is operable to analyse the drawn variance samples.

13. An apparatus according to claim 1, wherein said received set of signal values are representative of acoustic signals generated by a plurality of acoustic signal sources as modified by a respective transmission channel between each source and the or each receiver; wherein said predetermined function includes a plurality of first parts each associated with a respective one of said acoustic signal sources and each having a set of parameters which models the corresponding source and a plurality of second parts each for modelling a respective one of said transmission channels between said sources and said one or more receivers, each second part having a respective set of parameters which models the corresponding channel and wherein said processor is operable to obtain values of the parameters associated with at least one of said first parts from said probability density function.

14. An apparatus according to claim 13, wherein said function is in terms of a set of raw signal values representative of the acoustic signals generated by said sources before being modified by said transmission channels, wherein the apparatus further comprises a second processor operable to process the received set of signal values with initial estimates of said first and second parameters, to generate an estimate of the raw signal values corresponding to the received set of signal values and wherein said applicator is operable to apply said estimated set of raw signal values to said function in addition to said set of received signal values.

15. An apparatus according to claim 14, wherein said second processor comprises a simulation smoother.

16. An apparatus according to claim 14, wherein said second processor comprises a Kalman filter.

17. An apparatus according to claim 13, wherein one or more of said second parts comprises a moving average model and wherein the corresponding second parameters comprise moving average model coefficients.

18. An apparatus according to claim 1, further comprising an evaluator operable to evaluate said probability density function for the set of received signal values using one or more derived samples of parameter values for different numbers of parameter values for each of said signal models, to determine respective probabilities that the predetermined signal models have those respective parameter values and wherein said processor is operable to process at least some of said derived samples of parameter values and said evaluated probabilities to determine said parameter values that are representative of the acoustic signals generated by said at least one of said sources.

19. An apparatus according to claim 1, wherein said analyser is operable to determine, for each acoustic signal source, respective parameter values that are representative of the acoustic signals generated by the corresponding acoustic source.

20. An apparatus according to claim 1, further comprising a varying circuit operable to vary said stored predetermined function to vary the number of acoustic signal sources represented thereby, and wherein said applicator, processor and analyser are operable to perform their function for the respective different predetermined functions in order to determine the number of acoustic signal sources.

21. An apparatus according to claim 1, wherein said memory stores a plurality of predetermined functions each of which gives, for a given set of received signal values, a probability density for parameters of a respective different plurality of signal models which are assumed to have generated the acoustic signals represented by the received signal values; wherein said applicator, processor and analyser are operable to perform their function with respect to each of said stored functions and wherein the apparatus further comprises an evaluator operable to evaluate each of said functions with the determined parameter values for the respective functions and a comparator operable to compare the evaluated functions to determine the number of sources that best represents the received signal values.

22. An apparatus according to claim 1, comprising a plurality of receivers.

23. An apparatus according to claim 1, wherein said received set of signal values are representative of audio signals.

24. An apparatus according to claim 23, wherein said received set of signal values are representative of speech signals.

25. An apparatus according to claim 24, further comprising a speaker verifier operable to compare said determined parameter values with pre-stored speaker models to generate a verification result.

26. An apparatus according to claim 1, further comprising a comparator operable to compare said determined parameter values with pre-stored parameter values to generate a comparison result.

27. An apparatus according to claim 1, further comprising a recogniser operable to compare said determined parameter values with pre-stored reference models to generate a recognition result.

28. An apparatus according to claim 1, further comprising an encoder operable to encode said determined parameter values.

29. An apparatus according to claim 28, further comprising a transmitter operable to transmit said encoded parameter values.

30. An apparatus according to claim 28, further comprising a receiver for receiving the encoded parameter values, which receiver includes a decoder operable to decode the encoded parameter values and a generator operable to generate an output signal in dependence upon the decoded parameter values.

31. An apparatus according to claim 30, wherein said generator comprises a speech synthesiser operable for synthesising speech using the decoded parameter values.

32. An apparatus according to claim 30, wherein said generator comprises recognition a recogniser operable to perform recognition processing of said decoded parameter values to generate a recognition result.

33. A computer apparatus for generating annotation data for use in annotating a data file, the apparatus comprising:

a receiver operable to receive an audio annotation representative of audio signals generated by a plurality of audio sources;

an apparatus according to claim 1 for generating parameter values that are representative of the audio signals generated by at least one of said sources; and a generator operable to generate annotation data using said determined parameter values.

34. An apparatus according to claim 33, wherein said audio annotation comprises speech data and wherein said apparatus further comprises a speech recogniser for processing the parameter values to identify words and/or phonemes within the speech data; and wherein said annotation data comprises said words and/or phonemes.

35. An apparatus according to claim 34, wherein said annotation data defines a phoneme and word lattice.

36. A computer apparatus for searching a database comprising a plurality of annotations which include annotation data, the apparatus comprising:

a receiver operable to receive an audio input query representative of audio signals generated by a plurality of audio sources;

an apparatus according to claim 1 for determining parameter values that are representative of the audio signals generated by at least one of said audio sources; and a comparator operable to compare data representative of said determined parameter values with the annotation data of one or more of said annotations.

37. An apparatus according to claim 36, wherein said audio query comprises speech data and wherein the apparatus further comprises a speech recogniser for processing the speech data to identify word and/or phoneme data for the speech data; wherein said annotation data comprises word and/or phoneme data and wherein said comparator is operable to compare said word and/or phoneme data of said query with said word and/or phoneme data of said annotation.

38. An acoustic signal processing computer apparatus comprising:

one or more receivers operable to receive a set of signal values representative of a combination of a plurality of acoustic signals generated by a respective plurality of acoustic signal sources as modified by a respective transmission channel between each source and the or each receiver;

a memory operable to store data defining a predetermined function derived from a predetermined signal model which includes a plurality of first parts each associated with a respective one of said acoustic signal sources and each having a set of parameters which models the corresponding acoustic source and a plurality of second parts each for modelling a respective one of said transmission channels between said sources and said one or more receivers, each second part having a respective set of parameters which models the corresponding channel, said function being in terms of said parameters and generating, for a given set of received signal values, a probability density function which defines, for a given set of parameters, the probability that the predetermined signal model has those parameter values, given that the signal model is assumed to have generated the received set of signal values;

an applicator operable to apply said set of received signal values to said function;

a processor operable to process said function with those values applied to derive samples of the parameters associated with at least one of said first parts from said probability density function; and an analyser operable to analyse at least some of said derived samples to determine values of said parameters of said at least one first part, that are representative of the acoustic signal generated by the source corresponding to said at least one first part before it was modified by the corresponding transmission channel.

39. A computer based acoustic signal processing method comprising the steps of:

receiving a set of signal values representative of a combination of a plurality of acoustic signals generated by a plurality of acoustic signal sources using one or more receivers;

storing a predetermined function which gives, for a given set of received signal values, a probability density for parameters of a respective signal model, each of which is assumed to have generated a respective one of the acoustic signals represented by the received signal values;

applying the set of received signal values to said stored function to generate said probability density function;

processing said probability density function to derive samples of parameter values from said probability density function; and analysing at least some of said derived samples of parameter values to determine, for at least one of said sources, parameter values that are representative of the acoustic signals generated by said at least one of said sources.

40. A method according to claim 39, wherein said processing step draws samples of parameter values from said probability density function and wherein said analysing step analyses said drawn samples to determine said parameter values that are representative of the acoustic signals generated by said at least one of said sources.

41. A method according to claim 40, wherein said processing step draws samples iteratively from said probability density function.

42. A method according to claim 40, wherein said processing step uses a Gibbs sampler.

43. A method according to claim 39, wherein said analysing step determines a histogram of said derived samples and wherein said parameter values are determined from said histogram.

44. A method according to claim 43, wherein said analysing step determines said parameter values using a weighted sum of said derived samples, and wherein the weighting for each sample is determined from said histogram.

45. A method according to claim 39, wherein said receiving step receives a sequence of sets of signal values representative of acoustic signals generated by said plurality of signal sources and wherein said applying step, processing step and analysing step are performed for each set of received signal values in order to determine parameter values that are representative of the acoustic signals generated by said at least one of said sources.

46. A method according to claim 45, wherein said processing step uses the parameter values obtained during the processing of a preceding set of signal values as initial estimates for the parameter values of a current set of signal values being processed.

47. A method according to claim 45, wherein said sets of signal values in said sequence are non-overlapping.

48. A method according to claim 39, wherein said signal model comprises an auto-regressive process model and wherein said parameters include auto-regressive model coefficients.

49. A method according to claim 39, wherein said analysing step analyses at least some of said derived samples of parameter values to determine a measure of the variance of said samples and wherein the method further comprises the step of outputting a signal indicative of the quality of said received set of signal values in dependence upon said determined variance measure.

50. A method according to claim 49, wherein said probability density function is in terms of said variance measure, wherein said processing step draws samples of said variance measure from said probability density function and wherein said analysing step analyses the drawn variance samples.

51. A method according to claim 39, wherein said received set of signal values are representative of acoustic signals generated by a plurality of acoustic signal sources as modified by a respective transmission channel between each source and the or each receiver; wherein said predetermined function includes a plurality of first parts each associated with a respective one of said acoustic signal sources and each having a set of parameters which models the corresponding source and a plurality of second parts each for modelling a respective one of said transmission channels between said sources and said one or more receivers, each second part having a respective set of parameters which models the corresponding channel and wherein said processing step obtains values of the parameters associated with at least one of said first parts from said probability density function.

52. A method according to claim 51, wherein said function is in terms of a set of raw signal values representative of the acoustic signals generated by said sources before being modified by said transmission channels, wherein the method further comprises a second processing step of processing the received set of signal values with initial estimates of said first and second parameters to generate an estimate of the raw signal values corresponding to the received set of signal values and wherein said applying step applies said estimated set of raw signal values to said function in addition to said set of received signal values.

53. A method according to claim 52, wherein said second processing step uses a simulation smoother.

54. A method according to claim 52, wherein said second processing step uses a Kalman filter.

55. A method according to claim 51, wherein one or more of said second parts comprises a moving average model and wherein the corresponding second parameters comprise moving average model coefficients.

56. A method according to claim 39, further comprising the step of evaluating said probability density function for the set of received signal values using one or more derived samples of parameter values for different numbers of parameter values for each of said signal models, to determine respective probabilities that the predetermined signal models have those respective parameter values and wherein said processing step processes at least some of said derived samples of parameter values and said evaluated probabilities to determine said parameter values that are representative of the acoustic signals generated by said at least one of said sources.

57. A method according to claim 39, wherein said analysing step determines, for each acoustic signal source, respective parameter values that are representative of the acoustic signals generated by the corresponding source.

58. A method according to claim 39, further comprising the step of varying said stored predetermined function to vary the number of acoustic signal sources represented thereby, and wherein said applying step, processing step and analysing step are performed for the respective different predetermined functions in order to determine the number of acoustic signal sources.

59. A method according to claim 39, wherein a plurality of predetermined functions are stored, each of which gives, for a given set of received signal values, a probability density for parameters of a respective different plurality of signal models which are assumed to have generated the acoustic signals represented by the received signal values; wherein said applying step, processing step and analysing step are performed with respect to each of said stored functions and wherein the method further comprises the step of evaluating each of said functions with the determined parameter values for the respective functions and comparing the evaluated functions to determine the number of acoustic sources that best represents the received signal values.

60. A method according to claim 39, wherein said receiving step uses a plurality of receivers to receive said signal values.

61. A method according to claim 39, wherein said received set of signal values are representative of audio signals.

62. A method according to claim 61, wherein said received set of signal values are representative of speech signals.

63. A method according to claim 39, further comprising the step of comparing said determined parameter values with pre-stored parameter values to generate a comparison result.

64. A method according to claim 39, further comprising the step of using a recognition processor for comparing said determined parameter values with pre-stored reference models to generate a recognition result.

65. A method according to claim 39, further comprising the step of using a speaker verification system for comparing said determined parameter values with pre-stored speaker models to generate a verification result.

66. A method according to claim 39, further comprising the step of encoding said determined parameter values.

67. A method according to claim 66, further comprising the step of transmitting said encoded parameter values and, at a receiver, receiving the transmitted encoded parameter values, decoding the encoded parameter values and generating an output signal in dependence upon the decoded parameter values.

68. A method according to claim 67, wherein said generating step at said receiver synthesises speech using the decoded parameter values.

69. A method according to claim 67, wherein said generating step at said receiver comprises performing recognition processing of said decoded parameter values to generate a recognition result.

70. A computer based method for generating annotation data for use in annotating a data file, the method comprising the steps of:

receiving an audio annotation representative of audio signals generated by a plurality of audio signal sources;

a method according to claim 39 for generating parameters values that are representative of the audio signals generated by at least one of said audio sources; and generating annotation data using said determined parameter values.

71. A method according to claim 70, wherein said audio annotation comprises speech data and wherein said method further comprises the step of using a speech recognition system to process the parameter values to identify words and/or phonemes within the speech data; and wherein said annotation data comprises said words and/or phonemes.

72. A method according to claim 71, wherein said annotation data defines a phoneme and word lattice.

73. A computer based method for searching a database comprising a plurality of annotations which include annotation data, the method comprising the steps of:

receiving an audio input query representative of audio signals generated by a plurality of audio sources;

a method according to claim 39 for determining parameter values that are representative of the audio signals generated by at least one of said audio sources; and comparing data representative of said determined parameter values with the annotation data of one or more of said annotations.

74. A method according to claim 73, wherein said audio query comprises speech data and wherein the method further comprises the step of using a speech recognition system to process the speech data to identify word and/or phoneme data for the speech data; wherein said annotation data comprises word and/or phoneme data and wherein said comparing step compares said word and/or phoneme data of said query with said word and/or phoneme data of said annotation.

75. A computer based acoustic signal processing method comprising the steps of:

using one or more receivers to receive a set of signal values representative of a combination of a plurality of acoustic signals generated by a respective plurality of acoustic signal sources as modified by a respective transmission channel between each source and the or each receiver;

storing data defining a predetermined function derived from a predetermined signal model which includes a plurality of first parts each associated with a respective one of said signal sources and each having a set of parameters which models the corresponding source and a plurality of second parts each for modelling a respective one of said transmission channels between said sources and said one or more receivers, each second part having a respective set of parameters which models the corresponding channel, said function being in terms of said parameters and generating, for a given set of received signal values, a probability density function which defines, for a given set of parameters, the probability that the predetermined signal model has those parameter values, given that the signal model is assumed to have generated the received set of signal values;

applying said set of received signal values to said function;

processing said function with those values applied to derive samples of the parameters associated with at least one of said first parts from said probability density function; and analysing at least some of said derived samples to determine values of said parameters of said at least one first part, that are representative of the acoustic signal generated by the source corresponding to said at least one first part before it was modified by the corresponding transmission channel.

76. An acoustic signal processing computer apparatus comprising:

one or more receivers for receiving a set of signal values representative of a combination of a plurality of acoustic signals generated by a plurality of acoustic signal sources;

means for storing a predetermined function which gives, for a given set of received signal values, a probability density for parameters of a respective signal model, each of which is assumed to have generated a respective one of the acoustic signals represented by the received signal values;

means for applying the set of received signal values to said stored function to generate said probability density function;

means for processing said probability density function to derive samples of parameter values from said probability density function; and means for analysing at least some of said derived samples of parameter values to determine, for at least one of said acoustic sources, parameter values that are representative of the acoustic signals generated by said at least one of said sources.

77. An apparatus according to claim 76, wherein said analyser is operable to analyse said derived samples of parameter values to determine, for each acoustic signal source, respective parameter values that are representative of the acoustic signals generated by the corresponding source.

78. An acoustic signal processing computer apparatus comprising:

one or more receiving means for receiving a set of signal values representative of a combination of a plurality of acoustic signals generated by a respective plurality of acoustic signal sources as modified by a respective transmission channel between each source and the or each receiving means;

means for storing data defining a predetermined function derived from a predetermined signal model which includes a plurality of first parts each associated with a respective one of said acoustic signal sources and each having a set of parameters which models the corresponding source and a plurality of second parts each for modelling a respective one of said transmission channels between said sources and said one or more receiving means, each second part having a respective set of parameters which models the corresponding channel, said function being in terms of the parameters and generating, for a given set of received signal values, a probability density function which defines, for a given set of parameters, the probability that the predetermined signal model has those parameter values, given that the signal model is assumed to have generated the received set of signal values;

means for applying said set of received signal values to said function;

means for processing said function with those values applied to derive samples of the parameters associated with at least one of said first parts from said probability density function; and means for analysing at least some of said derived samples to determine values of said parameters of said at least one first part, that are representative of the acoustic signal generated by the source corresponding to said at least one first part before it was modified by the corresponding transmission channel.

79. A computer readable medium storing computer executable instructions for causing a programmable computer device to carry out an acoustic signal processing method, the computer executable instructions comprising instructions for:

receiving a set of signal values representative of a combination of a plurality of acoustic signals generated by a plurality of signal sources using one or more receivers;

storing a predetermined function which gives, for a given set of received signal values, a probability density for parameters of a respective signal model, each of which is assumed to have generated a respective one of the acoustic signals represented by the received signal values;

applying the set of received signal values to said stored function to generate said probability density function;

processing said probability density function to derive samples of parameter values from said probability density function; and analysing at least some of said derived samples of parameter values to determine, for at least one acoustic signal source, parameter values that are representative of the acoustic signals generated by said at least one of said sources.

80. A computer readable medium storing computer executable instructions for causing a programmable computer device to carry out an acoustic signal processing method, the computer executable instructions comprising instructions for:

using one or more receivers to receive a set of signal values representative of a combination of a plurality of acoustic signals generated by a respective plurality of signal sources as modified by a respective transmission channel between each source and the or each receiver;

storing data defining a predetermined function derived from a predetermined signal model which includes a plurality of first parts each associated with a respective one of said acoustic signal sources and each having a set of parameters which models the corresponding source and a plurality of second parts each for modelling a respective one of said transmission channels between said sources and said one or more receivers, each second part having a respective set of parameters which models the corresponding channel, said function being in terms of said parameters and generating, for a given set of received signal values, a probability density function which defines, for a given set of parameters, the probability that the predetermined signal model has those parameter values, given that the signal model is assumed to have generated the received set of signal values;

applying said set of received signal values to said function;

processing said function with those values applied to derive samples of the parameters associated with at least one of said first parts from said probability density function; and analysing at least some of said derived samples to determine values of said parameters of said at least one first part, that are representative of the acoustic signal generated by the source corresponding to said at least one first part before it was modified by the corresponding transmission channel.

81. Computer executable instructions for causing a programmable computer device to carry out an acoustic signal processing method, the computer executable instructions comprising instructions for:

receiving a set of signal values representative of a combination of a plurality of acoustic signals generated by a plurality of signal sources using one or more receivers;

storing a predetermined function which gives, for a given set of received signal values, a probability density for parameters of a respective signal model, each of which is assumed to have generated a respective one of the signals represented by the received signal values;

applying the set of received signal values to said stored function to generate said probability density function;

processing said probability density function to derive samples of parameter values from said probability density function; and analysing at least some of said derived samples of parameter values to determine, for at least one of said acoustic signal sources, parameter values that are representative of the acoustic signals generated by said at least one of said sources.

82. Computer executable instructions for causing a programmable computer device to carry out an acoustic signal processing method, the computer executable instructions comprising instructions for:

using one or more receivers to receive a set of signal values representative of a combination of a plurality of acoustic signals generated by a respective plurality of signal sources as modified by a respective transmission channel between each source and the or each receiver;

storing data defining a predetermined function derived from a predetermined signal model which includes a plurality of first parts each associated with a respective one of said signal sources and each having a set of parameters which models the corresponding source and a plurality of second parts each for modelling a respective one of said transmission channels between said sources and said one or more receivers, each second part having a respective set of parameters which models the corresponding channel, said function being in terms of said parameters and generating, for a given set of received signal values, a probability density function which defines, for a given set of parameters, the probability that the predetermined signal model has those parameter values, given that the signal model is assumed to have generated the received set of signal values;

applying said set of received signal values to said function;

processing said function with those values applied to derive samples of the parameters associated with at least one of said first parts from said probability density function; and analysing at least some of said derived samples to determine values of said parameters of said at least one first part, that are representative of the acoustic signal generated by the source corresponding to said at least one first part before it was modified by the corresponding transmission channel.

* * * * *